April 3, 1951 E. M. ROSCHKE 2,547,598

SUBSCRIPTION, IMAGE TRANSMISSION SYSTEM AND APPARATUS

Filed Sept. 13, 1947 10 Sheets-Sheet 1

ERWIN M. ROSCHKE
INVENTOR.

BY J. Clarke Nagey
HIS ATTORNEY

April 3, 1951 E. M. ROSCHKE 2,547,598

SUBSCRIPTION, IMAGE TRANSMISSION SYSTEM AND APPARATUS

Filed Sept. 13, 1947 10 Sheets-Sheet 2

ERWIN M. ROSCHKE
INVENTOR.

BY J. Clarke Nagey
HIS ATTORNEY

SUBSCRIPTION, IMAGE TRANSMISSION SYSTEM AND APPARATUS

Filed Sept. 13, 1947 10 Sheets-Sheet 3

ERWIN M. ROSCHKE
INVENTOR.
BY J. Clarke Hagey
HIS ATTORNEY

SUBSCRIPTION, IMAGE TRANSMISSION SYSTEM AND APPARATUS

Filed Sept. 13, 1947 10 Sheets-Sheet 4

ERWIN M. ROSCHKE
INVENTOR.
BY J. Clarke Hagey
HIS ATTORNEY

ERWIN M. ROSCHKE
INVENTOR.
BY J. Clarke Hagey
HIS ATTORNEY

SUBSCRIPTION, IMAGE TRANSMISSION SYSTEM AND APPARATUS

Filed Sept. 13, 1947

10 Sheets-Sheet 6

ERWIN M. ROSCHKE
INVENTOR.

BY J. Clarke Nagey
HIS ATTORNEY

April 3, 1951 E. M. ROSCHKE 2,547,598

SUBSCRIPTION, IMAGE TRANSMISSION SYSTEM AND APPARATUS

Filed Sept. 13, 1947 10 Sheets-Sheet 7

ERWIN M. ROSCHKE
INVENTOR.

BY J. Clarke Hagey
HIS ATTORNEY

ERWIN M. ROSCHKE
INVENTOR.
BY J. Clarke Hagey
HIS ATTORNEY

April 3, 1951 E. M. ROSCHKE 2,547,598

SUBSCRIPTION, IMAGE TRANSMISSION SYSTEM AND APPARATUS

Filed Sept. 13, 1947 10 Sheets-Sheet 9

ERWIN M. ROSCHKE
INVENTOR.

BY J. Clarke Nagey
HIS ATTORNEY

April 3, 1951 E. M. ROSCHKE 2,547,598

SUBSCRIPTION, IMAGE TRANSMISSION SYSTEM AND APPARATUS

Filed Sept. 13, 1947

10 Sheets-Sheet 10

ERWIN M. ROSCHKE
INVENTOR.

BY J. Clarke Nagey
HIS ATTORNEY

Patented Apr. 3, 1951

2,547,598

UNITED STATES PATENT OFFICE 2,547,598

SUBSCRIPTION IMAGE TRANSMISSION SYSTEM AND APPARATUS

Erwin M. Roschke, Chicago, Ill., assignor to Zenith Radio Corporation, a corporation of Illinois Application September 13, 1947, Serial No. 773,848

23 Claims. (Cl. 178—5.1)

This invention relates to image transmission systems of the subscriber type and more particularly to such systems as are disclosed and claimed broadly in the copending application Serial Number 742,374 of Alexander El'ett et al. entitled Radio-Wire Signalling System, filed on April 18, 1947, which has now issued to Patent No. 2,510,046, May 30, 1950, and assigned to the same assignee as the present application.

In that copending application the system is claimed for the transmission to subscribers only of a complete signal, part by radio broadcast and part by wire line conductor, which complete signal may be uti'ized in the subscriber's receiver to produce a complete usable picture. The wire line conductor may conveniently be a telephone line or a power line and some arrangement is provided in connection with that conductor whereby a record is kept of the time when the subscription signals are utilized by the subscriber so that he may be charged therefor. In the case of the telephone line, an operator may make suitable connections to transmit the required part of the signal over the telephone system to the individual subscriber and may record a charge therefor, or in a dial system such charge may be automatically recorded. In a power line system suitable meters may be provided, preferably located so that they can be read simultaneously with the usual power meter, to indicate the period of use of that part of the signal coming over the power line.

It is within the broad concept of that matter claimed in such copending application that the part of the signal which is transmitted by radio broadcast shall be insufficient to reproduce a proper picture un'ess the remaining part of the signal which can be received only by the wire line is utilized with the part received by radio broadcast.

It is an object of this invention to provide a particular system of that general type in which that part of the signal received by radio broadcast alone produces a picture which is moved recurrently back and forth in the vertical or horizontal direction so as to be viewable only with great difficulty unless such motion is cancel'ed out by appropriate signal received by wire line conductor.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figure 1:
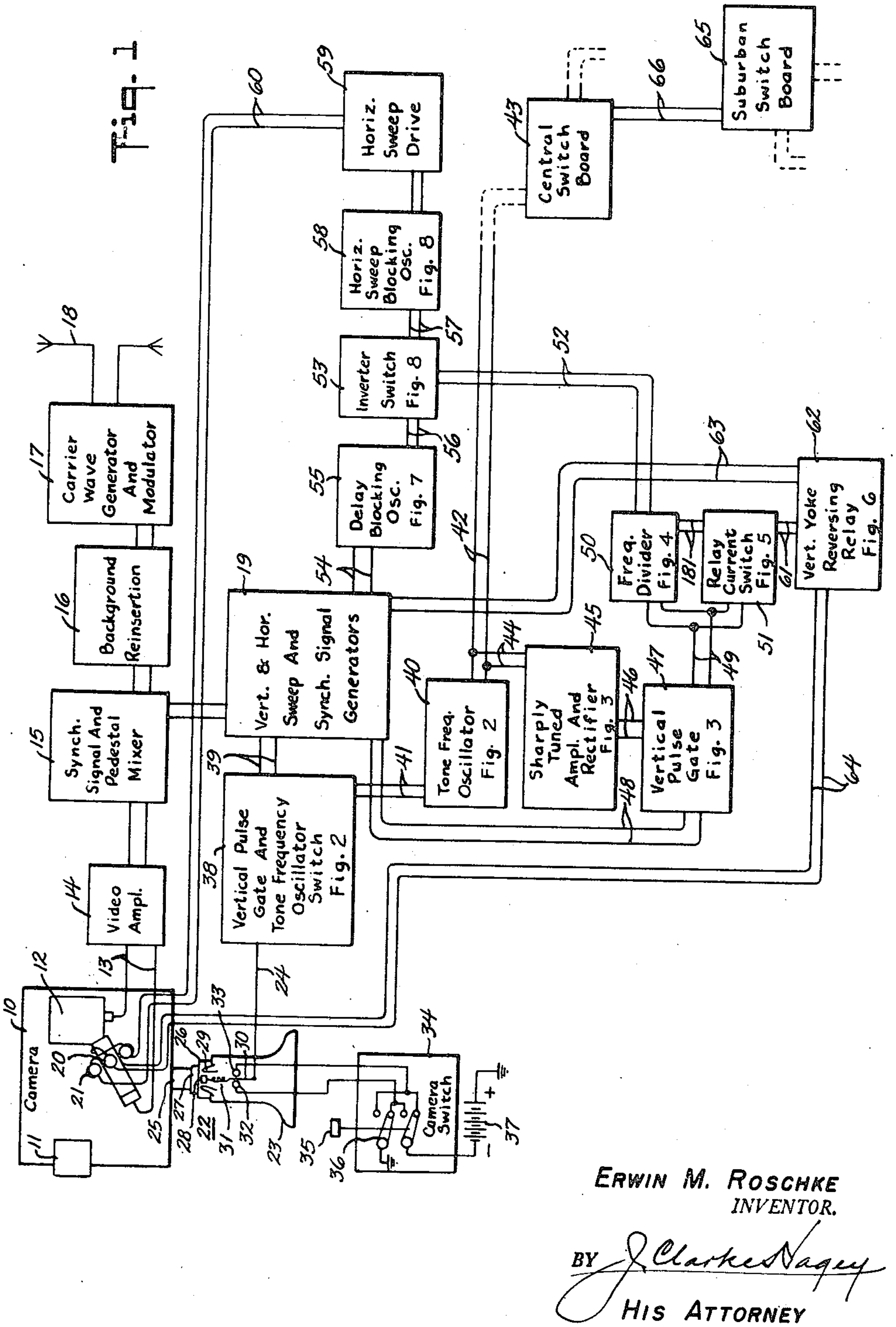
Figure 1 illustrates one form of image transmitter arranged according to the invention.

In Figure 1, the system illustrated actually does two things, one being to cause an image which is received and reproduced from only that part of the signal which is radio broadcast to move back and forth in a horizontal direction, and the other being to cause such an image recurrently to turn upside down and right side up. That part of the system of Figure 1 which causes such image recurrently to move back and forth is within the scope of the present invention. More specifically in this arrangement the time of scanning in the horizontal direction is recurrently a'tered with respect to the transmitted synchronizing signals and the alternation between the normal transmission of the image and the transmission with such alterations in scanning time is sufficiently rapid that, even if the user of a receiver without the proper signals received over wire line conductor should know just how the alteration is made, it would be most difficult to switch back and forth between the normal system and the altered system of transmission. Accordingly, with such a system it is high'y desirable from the standpoint of the person who wishes to view the image to pay the required fee and obtain the information necessary from the appropriate wire line conductor to realter the signals at the proper time so as to receive good picture service.

While, as illustrated, the alteration between normal picture signal transmission and transmission with inverted scanning direction and altered scanning time is accomplished at such times as the television camera is being moved across a scene or at such times when a change is made from one television camera to another, as when the scene is to be changed, the alteration in scanning time of horizontal lines may be made in accordance with the present disclosure at any desired time chosen entirely at random.

In Figure 1 a television camera 10 is provided with the usual lens system 11 and iconoscope or image orthicon 12 from which video signals are transferred through conductors 13 to a video amplifier 14. Amplified video signals are then transmitted from video amplifier 14 through a synchronizing signal and pedestal mixer 15, a background reinsertion device 16, and a carrier wave generator and modulator 17 to an antenna 18 from which they are radiated. In other words, the video signals which appear in conductors 13 are treated in an entirely normal fashion, and normal synchronizing signals and pedestals from a vertical and horizontal sweep and synchronizing signal generator 19 are mixed with those video signals in quite normal fashion in the mixer 15, so that the signal radiated from the antenna 18 appears to be quite normal unless it is attempted to reproduce it as a picture. Actually, the video signals which appear in conductors 13 are altered by special alteration of the vertical sweep signals which are impressed on the vertical yoke coils 20 associated with the iconoscope 12, and by special alteration of the horizontal sweep waves which are impressed on the horizontal sweep coils 21 associated with the iconoscope 12.

In order that the appropriate alterations are made at the desired time, a snap switch 22 is provided on the supporting base 23 for the camera 10, arranged so that, when the camera is being or has been turned in one direction, a conductor 24 is grounded and, when the camera is being or has been turned in the other direction, a negative potential is impressed on conductor 24. For this purpose, the camera base 23 supports a shaft 25 for rotation therewithin, the camera 10 being supported on the shaft 25. A collar 26 surrounds the shaft 25 and rests between the upper surface of the base 23 and a collar 27 integral with the shaft 25, the collar 26 being arranged always to turn with the camera and shaft 25 until a stop projection 28 on the collar 26 engages one or the other of two spaced stops 29. The switch 22 includes a moving contact member 30 supported at its lower end on the base 23 and bearing against one end of the spring 31, the other end of which presses against the stop 28 on collar 26. Suitable fixed contacts 32 and 33 are supported on base 23 on either side of the movable switch member 30. In consequence of the toggle action of the movable switch member 30 and spring 31, member 30 always rests against one or the other of the fixed contacts 32 and 33. One of the switch contacts 32 is grounded and the other is connected to a suitable source of negative potential.

For the purpose of making the alteration between normal transmission of the television picture signal and the above described altered transmission each time when transmission is switched from one camera to another, a special switch arrangement is provided in connection with the camera switch, which is arranged to change the connections of conductors 13 from one camera to another, so that it also reverses the connection with ground and negative potential to the two contacts 32 and 33. The camera switch 34 has an operating handle 35 which is connected with a double pole double throw switch 36, one movable blade of which is grounded and the other movable blade of which is connected to the negative terminal of the source 37 of biasing potential, the positive terminal of which source is grounded. The four fixed contacts of the double pole, double throw switch 36 are connected in usual fashion to the two contacts 32 and 33 so that upon each operation of the camera switch operating handle 35, the connections to ground and to the negative terminal of source 37 are reversed between contacts 32 and 33.

In consequence, the connection of conductor 24 is alternated between ground and the negative terminal of source 37 each time when the camera switch is operated, and also each time when the camera 10, which is at the time in use, is turned.

It is also preferred that the change from normal transmission to alternate transmission takes place during the transmission of the first vertical or frame impulse after operation of the camera switch 34 or turning of the camera to operate switch 22. For this purpose, conductor 24 is connected with a vertical pulse gate and tone frequency oscillator switch 38, to which positive going vertical synchronizing pulses are transmitted through conductors 39 from the vertical and horizontal sweep and synchronizing signal generators 19. The vertical pulse gate 38 is arranged to produce a control voltage only during the simultaneous existence of a positive going vertical synchronizing pulse received from conductors 39 whenever conductor 24 is grounded.

A tone frequency oscillator 40 is connected through conductors 41 to the vertical pulse gate and tone frequency oscillator switch 38 so that in the absence of the aforesaid control voltage the tone frequency oscillator 40 is caused to operate and produce a sine wave key signal, termed "tone frequency" for convenience. Tone frequency oscillations produced by the oscillator 40 are supplied through conductors 42 to a telephone line extending to a central switchboard 43.

The tone frequency oscillations from oscillator 40 are also supplied through conductors 44 connected with conductors 42 to a sharply tuned amplifier and rectifier 45, this amplifier being tuned with sufficient sharpness as to prevent the transmission through it of substantially all frequencies except that of the tone frequency oscillations from oscillator 40. In addition, the rectifier 45 is provided with a load circuit, the time constant of which is greater than the period of the tone frequency oscillations from oscillator 40 and the rectifier output is transferred through conductors 46 to a vertical pulse gate 47 which, whenever oscillations are produced by oscillator 40 and tuned, amplified and rectified by the rectifier 45, causes vertical pulses received from the vertical and horizontal sweep and synchronizing signal generator 19 through conductors 48 to be transferred through conductors 49 both to a frequency divider 50 and a relay current switch 51. The vertical pulses supplied through conductors 48 to the gate 47 are positive going and appear as negative going vertical pulses in conductors 49. The frequency of these pulses is divided a suitable number of times by frequency divider 50 to a rate which will prove objectionable when used to cause alteration of the transmitted pictures during the intervals when such alterations are being caused.

The lower frequency pulses produced by the frequency divider 50 are transferred through conductors 52 to an inverter switch 53, which operates to advance or delay, under the control of the pulses received through conductors 52, the production of horizontal sweep signals which are impressed on the horizontal sweep coils 21 of the camera 10. To this end, horizontal synchronizing pulses are transferred through conductors 54 from the vertical and horizontal sweep and synchronizing signal generator 19 to a delayed blocking oscillator 55 and then through conductors 56 to the inverter switch 53, the output pulses of which are inverted or not inverted according to the presence or absence of a pulse received by way of conductors 52. The output pulses from the inverter switch 53 are transferred through conductors 57 to a horizontal sweep blocking oscillator 58, whose output drives a conventional horizontal sweep drive 59 which is connected through conductors 60 to the horizontal sweep coils 21 of the camera 10.

In consequence of this arrangement, during certain intervals the camera switch 34 and the camera turning switch 22 cause pulses not to appear in conductors 52, during which interval the inverter switch 53 does not operate and normal horizontal sweep signals are transferred through conductors 60 to the horizontal sweep coil 21 in camera 10. In the alternate intervals when the camera switch 34 and the camera turn switch 22 so provide, pulses appear in conductors 52 and, under control of those pulses, the horizontal sweep voltage delivered to the horizontal sweep coils 21 of camera 10 through conductors 60, is advanced or delayed in time a predetermined amount, which is preferably relatively small compared to the time period of one horizontal sweep and retrace. The result during those intervals is that the video signal produced by camera 10 on conductors 13 is, in effect, alternately advanced and retarded in time with respect to the horizontal synchronizing pulses and pedestals mixed with it in mixer 15, and it is quite difficult during those intervals to adjust a receiver to correct for such alternate advance and retard in the time of transmission of video signals, and even more difficult to anticipate times when such alternate advance and retard in the sweep current is to be started or stopped.

Pulses impressed by the vertical pulse gate 47 on conductor 49 are also impressed on relay current switch 51 which, in the presence of pulses on conductors 49, causes current to flow through conductors 61 connected with a vertical yoke reversing relay 62. The relay 62 is arranged merely to reverse the connection between its input conductors 63 and the conductors 64 which are arranged to deliver the vertical sweep pulses on conductors 63 to the vertical sweep coils 20 in camera 10.

In consequence, when the vertical yoke reversing relay 62 is operated to reverse the connections between conductors 63 and 64, the transmitted picture is scanned in an inverted fashion so that a normal receiver would reproduce the picture upside down. This rapid reversal of the picture in the receiver from rightside up to upside down makes the difficulties of correction even greater, particularly since those alternate reversals take place only during intervals when pulses appear on conductors 52.

The relay current switch 51 and the inverter switch 53 are arranged, as is described hereinafter, in the following figures where specific circuits are illustrated, so that they always leave the picture right side up and with normally timed synchronizing pulses during those intervals when normal transmission is being produced.

It is important to note in connection with this arrangement that the complete television signal includes a program signal and a key signal, the program signal being transmitted by radio broadcast and the key signal by wire line conductor only. The key signal is actually the information transmitted by the alternate presence and absence of tone frequency oscillations on the wire line conductor 42. The program signal is that which is transmitted by radio broadcast and is not properly reproduceable without the key signal for which a subscriber must pay.

In order that the tone frequency oscillations which represent the key signal and are impressed on conductor 42 shall not interfere in any way with normal telephone service, it is desirable that the tone frequency oscillations be arranged not to be reproduced in telephones connected with the central switchboard 43. For that purpose it is preferred either that the tone frequency oscillations be outside the audio-frequency range normally used by the telephone sets, suitable filters being provided to insure separation of the tone frequency oscillations of the telephone line and audio-frequency signals normally used between telephone sets, or that a single frequency be used within the audio-frequency range of relatively low level and suitable filters be provided to prevent a very narrow band of frequencies around that single frequency from operating the telephone set.

It is quite usual that telephone systems are constructed with restricted frequency pass bands in trunk lines connecting main and sub-station switchboards. Consequently, the transfer of tone frequency oscillation from the oscillator 40 through the telephone line to the central switchboard 43 and then through such a trunk line to a suburban switchboard 65 may be difficult or impossible. While it is possible to adjust the frequency of the oscillator 40 so that it lies within the signal range of the ordinary telephone system, and to provide suitable rejection filters in the telephone system very sharply tuned to reject only the frequency of oscillations from the oscillator 40, it is preferred to provide a special line 66 between such switchboards 43 and 65 as may normally have trunk lines extending therebetween with restricted frequency characteristics. With such a special line 66, control oscillations from each of a number of television transmitters may be distributed from the central switchboard 43 to outlying switchboards, which in turn may make connections as called for, and may also make the appropriate charges to persons who wish to receive the proper tone frequency oscillations, properly timed, from the television transmitter.

In the operation of such a transmitter as is illustrated in Figure 1, one caution should be observed particularly. With an ordinary iconoscope in the camera 10, special shading voltages are normally required to correct the video signals appearing on conductors 13. These shading voltages are different when the picture is altered by turning it upside down. However, if an orthicon type picture pickup tube is used, substantially no change in shading is necessary. Similarly, an ordinary iconoscope requires a keystoning correction which must be reversed when the picture is turned upside down, whereas the orthicon type picture pickup tube requires no keystoning voltage.

Figure 2:
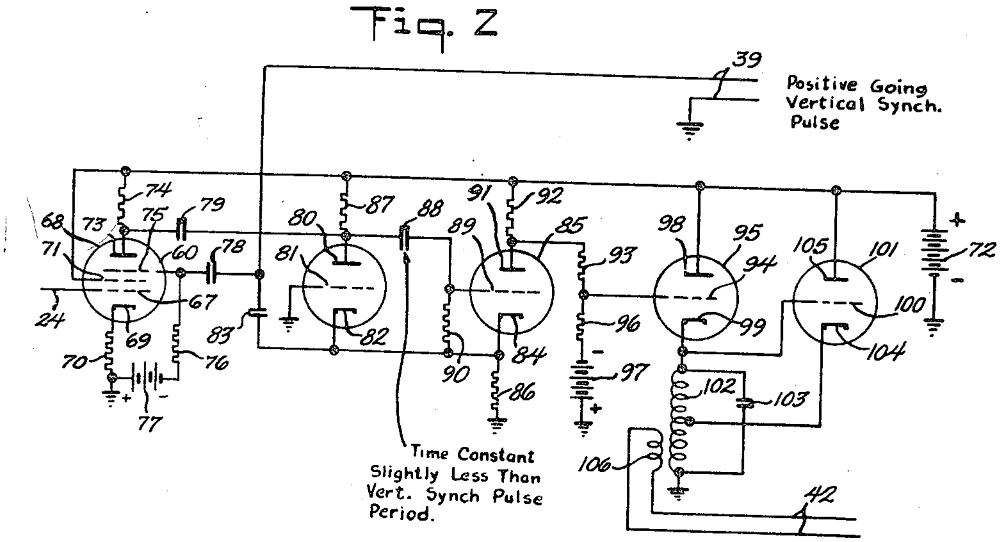
Figure 2 through 8 illustrate certain detailed circuit arrangements forming portions of Figure 1.

In Figure 2 the vertical pulse gate and tone frequency oscillator switch 38 and tone frequency oscillator 40 are shown in detail. The conductor 24 is connected to the first control electrode 67 of an electron discharge device 68 arranged as a gating switch. The cathode 69 is grounded through a biasing resistance 70, the screen electrode 71 is connected to the positive terminal of the source 72 of operating potential, the negative terminal of which source is grounded, and the anode 73 is connected through a load resistance 74 to the positive terminal of source 72. The second control electrode 75 is connected through a grid resistance 76 to the negative terminal of source 77 of grid biasing potential, the positive terminal of which is grounded. The second control electrode 75 is also coupled through a coupling condenser 78 to the ungrounded conductor 39.

At all times when the conductor 24 is maintained at a negative potential, discharge current through device 68 is cut off and the anode 73 remains at a positive potential, regardless of the potential of control electrode 75. However, when the conductor 24 is grounded, control electrode 75 is recurrently changed in potential positively sufficient to cause the device 68 to conduct current during the presence of positive going vertical synchronizing pulses on conductors 39. When device 68 conducts current, the anode 73 recurrently therefore produces corresponding negative pulses of potential. The anode 73 of device 68 is connected through a coupling condenser 79 to the anode 80 of an electron discharge amplifier device, whose control electrode 81 is grounded and whose cathode 82 is connected through a coupling condenser 83 to the ungrounded conductor 39, and whose cathode 82 is also connected to the cathode 84 of another electron discharge device 85, the two cathodes being connected in common through a resistance 86 to ground. The anode 80 is also connected through a load resistance 87 to the positive terminal of source 72 and is also connected through a coupling condenser 88 to the control electrode 89 of device 85, a grid resistance 90 being connected between control electrode 89 and cathode 84. The anode 91 of device 85 is connected through a load resistance 92 to the positive terminal of source 72, and is also connected through a resistance 93 to the control electrode 94 of an electron discharge device 95 arranged to operate as a switch. Control electrode 94 of device 95 is connected through a resistance 96 to the negative terminal of a source 97 of biasing potential, the positive terminal of which source is grounded. The anode 98 of the device 95 is connected directly to the positive terminal of source 72 and the cathode 99 of device 95 is connected directly to the control electrode 100 of an oscillating discharge device 101. Cathode 99 and control electrode 100 are also connected to one terminal of an inductance 102 whose other terminal is grounded, a condenser 103 being connected in parallel with inductance 102 to form a circuit tuned to resonate at the desired tone frequency. A tap on inductance 102 is connected with the cathode 104 of the oscillating device 101, whose anode 105 is connected directly to the positive terminal of source 72.

An inductance coil 106 is magnetically coupled with the inductance 102 and is connected between conductors 42 so that tone frequency oscillations whenever produced by the oscillating device 101 and the resonant circuit 102 and 103 are impressed on conductors 42.

As pointed out, when device 68 is conducting so that anode 73 and control electrode 89 are at minimum potential and conductor 24 then becomes negative, anode 73 rises in potential causing control electrode 89 to rise in potential so that device 85 becomes and remains conducting. When grid 89 starts in the positive direction, device 85 becomes conductive and cuts off current flow between anode 80 and cathode 82. So long as device 85 remains conducting, during the time while conductor 24 is negative, its anode 91 remains at a relatively low potential and the potential of source 97 is sufficient that control electrode 94 of device 95 maintains device 95 in nonconductive condition. During such times, the oscillating discharge device 101 produces continuous tone frequency oscillations which are transmitted over conductors 42.

During other intervals while conductor 24 is at ground potential, negative potential pulses appear on anode 73 which tend to make device 85 non-conductive and to maintain current flow between cathode 82 and anode 80. As indicated by the label "Time constant slightly less than vertical synchronizing pulse" the coupling condenser 88 with its associated circuit elements has a time constant such that device 85 during this time remains cut off for all intervals except extremely small intervals preceding each vertical pulse. Therefore, for all such intervals when device 85 is cut off device 95 conducts current heavily, anode 91 being maintained substantially at the potential of the positive terminal of source 72, and the oscillating discharge device 101 remains substantially inoperative except for such very small intervals immediately preceding this vertical pulse. These intervals are so small that the tuned circuit 102, 103 has no time to build up any appreciable oscillation. Consequently during the intervals that the conductor 24 is grounded, no appreciable tone frequency signal is transmitted over conductors 42.

In the arrangement of Figure 2, therefore, whenever the potential on conductor 24 rises to ground potential, at the time of the next succeeding positive going vertical synchronizing pulse on conductors 39 the tone frequency oscillator including tuned circuit 102, 103 ceases operation. Thereafter, following the appearance of a negative potential on conductor 24 and at the time when the next succeeding positive going vertical synchronizing pulse appears on conductors 39, the tone frequency oscillator again begins oscillation and continues transmitting the tone frequency on conductors 42 until the potential on conductor 24 again rises to ground potential.

Figure 3:
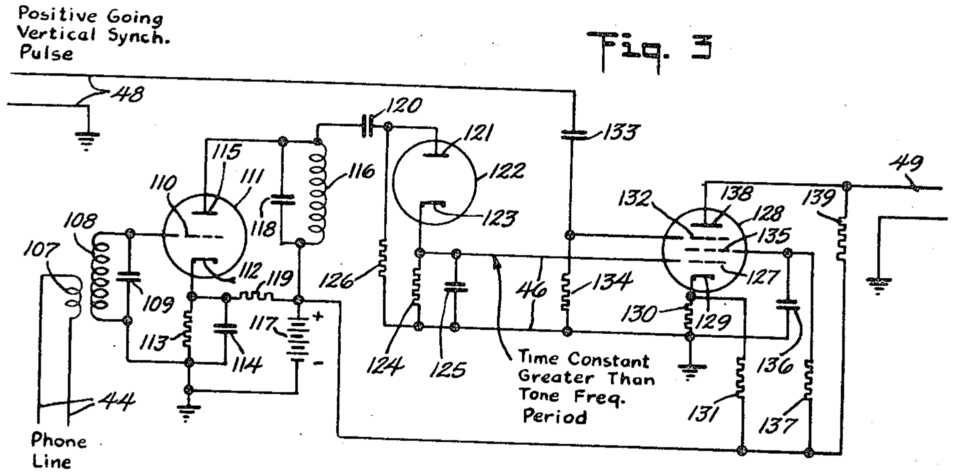

Figure 3 illustrates the circuit arrangement of the tuned amplifier and rectifier 45, and the vertical pulse gate 47. This gate, in the presence of tone frequency oscillations on conductors 44, which, as shown in Figure 1, are connected with conductors 42, transfers positive going vertical synchronizing pulses from conductors 48 to conductors 49, and prevents such transfer when tone frequency oscillations are not present on conductors 44. For that purpose an inductance 107 is connected between conductors 44 and is coupled magnetically with an inductance 108 in shunt with a condenser 109 to form a resonant circuit tuned to the frequency of the tone frequency oscillation. The control electrode 110 of an electron discharge amplifier device 111 is conin the presence of a negative going edge of a pulse between conductors 49, the control electrode 142 is forced momentarily in the negative direction. The same thing is true of the condenser 156 and the resistances associated with it.

Assuming that, to begin with, discharge device 143 is conducting, cathode 144 is at a substantially positive potential with respect to ground and anode 147 is at a minimum positive potential. The voltage division produced across resistances 158 and 153 is made to cause control electrode 152 of device 151 to cut off current pulses through that device. In that condition, the negative bias voltage between cathode 150 and control electrode 152 is made sufficiently far beyond cutoff for device 151 that positive voltage pulses impressed from conductors 49 on control electrodes 142 and 152 do not increase the voltage of control electrode 152 sufficiently to cause any current to flow in device 151. At the same time, an increase of positive potential on control electrode 142 does not substantially increase current flow through device 143 and in any case does nothing more than maintain device 143 conductive and device 151 non-conductive.

However, whenever a negative potential pulse is impressed on control electrodes 142 and 152, while the increased negative potential on control electrode 152 does nothing, the negative potential on electrode 142 tends to reduce current flow through device 143, thereby reducing the positive potential of cathode 144 and increasing the positive potential of anode 147. By reason of the cross-connection, the potential of cathode 150 at the same time becomes less positive and the potential of control electrode 152 becomes less negative so that current begins to flow through device 151, the anode 154 of which drops in potential and by reason of coupling condenser 161 causes the potential of control electrode 142 to become still more negative. This process accelerates until device 143 no longer carries current and all of the current is carried by device 151. This condition continues until the next succeeding negative potential impulse is impressed on control electrodes 142 and 152, at which time the reverse action takes place to make device 143 conductive and device 151 non-conductive. In consequence, the potential of anode 154 becomes more positive following one negative potential pulse impressed on control electrode 142. It is therefore apparent that the frequency of the wave appearing on anode 154 is just one-half that of the pulses appearing on conductors 49.

A second frequency division is carried out by two succeeding electron discharge devices 162 and 163 connected in similar fashion. The anode 164 of device 162 is connected through a pair of resistors 165 and 166, in series, to the anode 167 of device 163. A resistor 168 is connected between the positive terminal of source 149 and a point between resistances 165 and 166. Anode 154 of device 151 is connected through a coupling condenser 169 to a point between resistances 165 and 166. Cathodes 170 and 171 of discharge devices 162 and 163, respectively, are connected together and through a resistance 172 to ground. The control electrode 173 of device 162 is connected through a grid resistance 174 to ground and through a parallel combination of resistance 175 and condenser 176 to anode 167 of device 163. Similarly, the control electrode 177 of device 163 is connected through a grid resistance 178 to ground and through a parallel combination of resistance 179 and condenser 180 to anode 164 of device 162.

The time constant of condenser 169 and the associated resistances, as indicated by the label "Differentiating circuits" is made sufficiently small that only the leading and trailing edges of waves appearing on anode 154 of device 151 are impressed across resistance 168 and hence through resistances 165 and 166, respectively, on control electrodes 177 and 173. These leading and trailing edges are impressed on control electrodes 173 and 177 in the form of alternately positive and negative going short pulses which operate on discharge devices 162 and 163 in a fashion similar to the operation of devices 143 and 151 so that there appear on the anode 167 of device 163 waves whose frequency is half that of the waves appearing on anode 154 of device 151 and only one-quarter of the frequency of waves between conductors 49. One of the conductors 52 is grounded and the other connected directly to anode 167 so that these waves of one quarter frequency appear between the conductors 52.

For the purpose of assuring, when waves disappear between conductors 49 after the vertical pulse gate 47 stops transmission of vertical pulses, that the discharge devices 162 and 163 will be maintained in a desired voltage condition between conductors 52 so that the inverter switch 53 during those times will remain in the proper condition, a suitable pulse is impressed on control electrode 177 through a pair of conductors 181 connected from the relay current switch 51 as shown in Figure 1. One of the conductors 181 is grounded and the other is connected through a series arrangement of resistance 182 and condenser 183 to control electrode 177. The condenser 183 with its associated resistances is made to have a short time constant, as indicated by the label "Differentiating circuits" in order that alternately recurrent short positive and negative pulses are impressed from conductors 181 on the control electrode 177.

Figures 5, 6, 7:
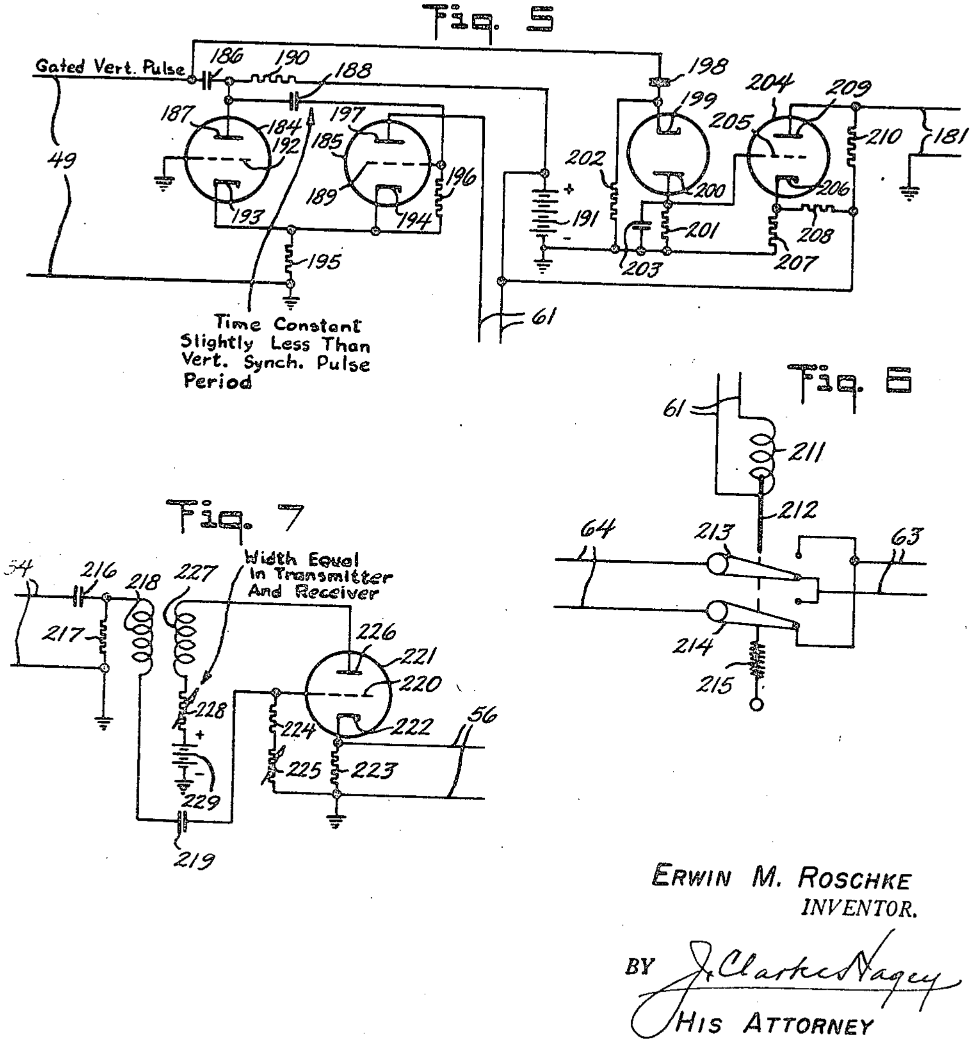

In Figure 5 conductors 49 (shown in Figure 1 as being connected with the vertical pulse gate 47) impress negative going vertical pulses on the relay current switch 51 which includes two electron discharge devices 184 and 185. One of the conductors 49 is grounded, and the other is connected through a coupling condenser 188 to control electrode 189 of device 185. Anode 187 is connected through a load resistance 190 to the positive terminal of a source 191 of operating potential, the negative terminal of which source is grounded. The control electrode 192 of device 184 is grounded and its cathode 193 is connected directly with the cathode 194 of device 185, both cathodes being connected in common through a resistance 195 to ground. Control electrode 189 of device 185 is connected through a grid resistance 196 to the cathodes 193 and 194. The anode 197 of device 185 is connected to one of two conductors 61, between which the coil of the vertical yoke reversing relay is connected, the relay being shown in Figure 1 as rectangle 62. The other of the conductors 61 is connected to the positive terminal of source 191.

In the absence of vertical pulses between conductors 49, device 185 remains conductive and device 184 non-conductive, so that current continually flows through conductors 61 from source 191. Upon the appearance of negative going gated vertical pulses between conductors 49, and on control electrode 189 of device 185, current conduction through device 185 begins to decrease nected with one terminal of the tuned circuit 108, 109, the other terminal of which tuned circuit is grounded and also connected to cathode 112 of device 111 through a parallel combination of biasing resistance 113 and by-passing condenser 114. The anode 115 of the device 111 is connected to one terminal of an inductance 116, the other terminal of which is connected to the positive terminal of the source 117 of operating potential, the negative terminal of such source being grounded. A tuning condenser 118 is connected in shunt with inductance 116 to form a circuit resonant to the tone frequency oscillation. It is desirable to make both the tuned circuit 108, 109 and the tuned circuit 118, 116 of good quality so that several cycles of the tone frequency are required to build up substantial alternating potentials in those circuits. In order to prevent device 111 from responding to very small potentials appearing across conductors 44, a resistance 119 is connected between cathode 112 and the positive terminal of source 117 to maintain a fixed minimum bias between cathode 112 and control electrode 110, so that device 111 will not amplify very small potentials. With such an arrangement, extraneous noise voltages appearing across conductors 44 or very short bursts of weak intensity oscillation from device 95 of the vertical pulse gate and tone frequency oscillator switch 38 (Fig. 2) are not reproduced in the tuned circuit 116, 118 to cause false operation of the circuit arrangement.

The amplified oscillations appearing on anode 115 of device 111 are transferred through condenser 120 to the anode 121 of a rectifying discharge device 122, whose cathode 123 is connected through a resistance 124 to ground. A condenser 125 is connected in parallel with the resistance 124 and a resistance 126 is connected between anode 121 and ground so that device 122 rectifies tone frequency oscillations appearing on anode 115 and in response thereto develops across resistance 124 a continuous potential which is positive with respect to ground.

The ungrounded terminal of resistance 124 is connected directly with the first control electrode 127 of an electron discharge device 128 whose cathode 129 is connected through a biasing resistance 130 to ground. The cathode 129 is also connected through a resistance 131 to positive terminal of source 117 so as to maintain cathode 129 at a fixed positive bias with respect to the first control electrode 127 and the second control electrode 132 of device 128. It may be here noted that the connection between the upper terminal of resistance 124 and first control electrode 127 is one of the conductors 46 illustrated in Figure 1, while the connection between ground and the other terminal of resistance 124 is the other of conductors 46 of Figure 1.

One of the conductors 48 (shown in Figure 1) is grounded and the other is coupled through a condenser 133 to the second control electrode 132 of device 128, the control electrode 132 being also connected through a grid resistance 134 to ground. The screen electrode 135 of device 128 is connected through a by-passing condenser 136 to ground and through a resistance 137 to positive terminal of source 117 to maintain the screen electrode at a fixed positive potential with respect to cathode 129. The anode 138 of device 128 is connected directly with one of the conductors 49, the other of which is grounded, and the anode 138 is also connected through a load resistance 139 to the positive terminal of source 117.

When a continuous positive potential appears across resistance 124 in the presence of tone frequency oscillations on conductors 44, so as to make control electrode 127 positive with respect to ground, cathode 129 is also a positive potential with respect to ground, but not at a sufficiently positive potential to maintain device 128 cut off if the second control electrode 132 were also at a positive potential. However, the bias voltage across resistance 130 is sufficient even when control electrode 127 is positive with respect to ground, to maintain current flow through device 128 cut off so long as control electrode 132 remains at ground potential.

Consequently, voltage pulses appear on anode 138 of device 128 only when tone frequency oscillations appear on conductors 44, and even then only when positive going vertical synchronizing pulses from conductors 48 are impressed through coupling condenser 133 on control electrode 132. These vertical synchronizing pulses appearing between conductor 48 therefore are impressed on conductor 49 whenever a tone frequency signal appears on conductors 44.

Figure 4:
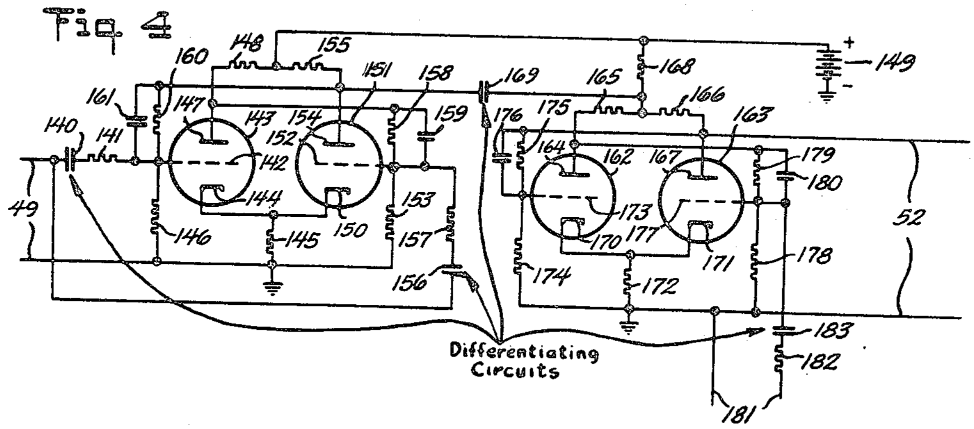

Figure 4 illustrates in detail the circuit arrangement of the frequency divider 50 shown in Figure 1. In this divider the properly gated vertical pulses from the gate 47 appear on conductors 49 and are changed in frequency to produce a higher or lower frequency pulse which can be used to produce the most objectionable recurrent alterations in the picture during the time when a tone frequency signal appears on conductors 42 in Figure 1. In the example illustrated in Figure 4, the vertical pulse rate is reduced in frequency by dividing the original vertical pulse frequency in half twice. For this purpose the ungrounded one of conductors 49 is coupled through a series combination of a condenser 140 and a resistance 141 to the control electrode 142 of a discharge device 143, whose cathode 144 is connected through a resistance 145 to ground. The control electrode 142 is connected through a grid resistance 146 to ground and the anode 147 of device 143 is connected through a suitable load resistance 148 to the positive terminal of a source 149 of operating potential, the negative terminal of which source is grounded. Cathode 144 is also connected directly to the cathode 150 of a second electron discharge device 151, whose control electrode 152 is connected through a grid resistance 153 to ground, and whose anode 154 is connected through a load resistance 155 to the positive terminal of source 149. The control electrode 152 is also connected through a series combination of a condenser 156 and a resistance 157 to the ungrounded one of conductors 49. Anode 147 of discharge device 143 is also connected to a parallel combination of a resistance 158 and condenser 159 to the control electrode 152 of device 151, and similarly, the anode 154 of device 151 is connected through a parallel combination of resistance 160 and condenser 161 to the control electrode 142 of device 143.

As should be understood by the label "Differentiating circuits" and by the associated arrows the condenser 140 and its associated resistances are arranged to have a time constant which is quite short compared with the duration of a pulse appearing on the conductors 49, so that in the presence of the positive going edge of a pulse between conductors 49 control electrode 142 is momentarily forced in the positive direction, while with the result that cathode 194 drops in potential and device 184 begins to conduct, with anode 187 also dropping in potential and, being coupled through condenser 188 with control electrode 189, consequently reducing the potential of control electrode 189 still further. This process is continued until device 185 no longer conducts current and the device 184 is fully conductive.

As indicated by the label "Time constant slightly less than vertical synchronizing pulse period" the condenser 188, together with associated resistances must maintain the control electrode 189 sufficiently negative with respect to cathode 194 that the device 185 does not conduct current until a time just prior to the appearance of a succeeding negative going negative pulse between conductors 49. Upon the appearance of such a succeeding negative going vertical pulse upon control electrode 189, the device 185 is again driven beyond cutoff and continues in that fashion so long as pulses appear between conductors 49 with the exception of very short times just preceding each of the pulses between conductors 49. Average current flow through conductors 61 during this time is therefore extremely small and the relay 62 connected with conductors 61 is made insensitive to such small average current.

After the disappearance of pulses between conductors 49, and slightly before the time when a succeeding vertical pulse would have appeared, device 185 begins to conduct and reverse operation takes place to cause device 184 to become non-conductive and device 185 fully conductive so that maximum current flows steadily through conductor 61.

The ungrounded one of conductors 49 is also connected through a condenser 198 to the cathode 199 of a rectifying discharge device, the anode 200 of which is connected through a resistance 201 to ground.

The cathode 199 is also connected through a resistance 202 to ground and a condenser 203 is connected in shunt with resistance 201 so that, in the presence of negative going vertical pulses between conductors 49, rectified current flows between cathode 199 and anode 200 and a negative average potential appears across resistance 201.

A switching discharge device 204 has a control electrode 205 connected with the ungrounded end of resistance 201 and a cathode 206 connected to ground through a biasing resistance 207, and also connected through a resistance 208 to the positive terminal of source 191. The anode 209 of device 204 is connected through a load resistance 210 to the positive terminal of source 191 and also to the ungrounded one of conductors 181.

In consequence, in the absence of vertical pulses appearing between conductors 49, no voltage exists across resistance 201 and resistances 207 and 208 are so proportioned that the switching discharge device 204 passes substantial discharge current through resistance 210. Upon the appearance of vertical pulses between conductors 49, rectified negative voltage with respect to ground appears across resistance 201 of sufficient magnitude to cut off current flow through device 204 so that anode 209 rises in potential. This rise in potential, which is impressed through resistance 182 and condenser 183 in Figure 4 on control electrode 177 of device 163, immediately causes device 163 to become conductive at the same time pulses appear between conductors 49 and the frequency divider of Figure 4 begins operation at that point. When the vertical pulses disappear between conductors 49, voltage disappears across resistance 201 and current flow is initiated through device 204, the resistors 207 and 208 being properly proportioned to that end so that anode 209 drops in potential with the result that a negative pulse is impresesd on control electrode 177 of discharge device 163, causing it to become and remain nonconductive, as is desired upon the disappearance of vertical pulses on conductors 49.

The vertical yoke reversing relay 62, which, as shown in Figure 1, is connected between the conductors 63 and the conductors 64, is illustrated in detail in Figure 6. As is shown, conductors 61 are connected to the terminals of a relay coil 211 whose armature 212 is arranged to move the movable contacts 213 and 214 of a double pole, double throw switch. A spring 215 is provided to resist attraction of the armature 212 by the coil 211 so that, when the coil 211 is not carrying current, the movable contacts 213 and 214 are in the lowermost position. When the coil 211 carries current the two movable contacts 213 and 214 are in the uppermost position.

Conductors 64 are connected respectively to the two movable contacts 213 and 214 and the two conductors 63 (shown in Figure 1 as connected to the vertical and horizontal sweep and synchronizing signal generators 19), are connected, respectively with the two intermediate fixed contacts of the double pole double throw switch and with the two outermost fixed contacts. Operation of the movable contacts 213 and 214, therefore, in either direction reverses the connection between conductors 63 and 64, thereby reversing the polarity of the vertical sweep current passing through these conductors and through the vertical sweep coils 20, shown in Figure 1, and consequently, turning the picture upside down or rightside up as the case may be.

The delay blocking oscillator 55 is shown in detail in Figure 7. This oscillator functions to produce a steep sided pulse wave form whose leading edge coincides with the leading edge of horizontal synchronizing pulses transferred to this oscillator through conductors 54 from the vertical and horizontal sweep and synchronizing signal generators 19 in Figure 1. One of the conductors 54 is grounded and the other is connected through a condenser 216 to one terminal of a resistance 217 of which the other terminal is grounded. The ungrounded terminal of resistance 217 is connected serially through an inductance coil 218 and a coupling condenser 219 to the control electrode 220 of an electron discharge device 221, the cathode 222 of which is connected through a resistance 223 to ground. The control electrode 220 is also connected through a relatively large grid resistance 224 and through a relatively small variable resistance 225 to ground. The anode 226 of device 221 is connected serially through an inductance 227 (which is magnetically coupled to inductance coil 218 in the proper sense to cause oscillations of the device 221) and a variable resistance 228 to the positive terminal of a source 229 of operating current for the device 221, the negative terminal of source 229 being grounded.

The circuit arrangement shown is that of a normal blocking oscillator, the variable resistance 225 being adjustable to adjust the blocking rate of the oscillator so that it is substantially equal to the rate of recurrence of pulses appearing on the conductors 54. Resistance 228 is made adjustable as indicated by the label "Width equal in transmitter and receiver" to adjust the width of the steep sided pulses produced in order that the width or time duration of each pulse produced by the blocking oscillator 55 shall be a relatively small percentage of the total horizontal sweep time, such width for example being in the order of 3% of the horizontal sweep time.

Conductors 56 are connected directly across resistance 223 so that the steep sided narrow pulses produced by the oscillator, which of course appear across resistance 223, are transferred through conductors 56 to the inverter switch 53 of Figure 1.

Figure 8:
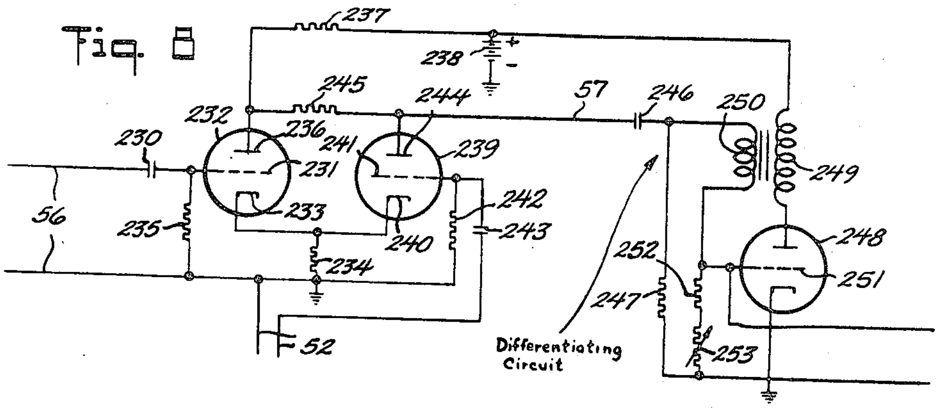

In Figure 8, circuit details are shown for the inverter switch 53 and the horizontal sweep blocking oscillator 58 of Figure 1. Steep sided short pulses produced by the delay blocking oscillator 55 and appearing across conductors 56 are impressed through a coupling condenser 230 on a control electrode 231 of an electron discharge device 232, the cathode 233 of which is connected through a resistance 234 to ground. The control electrode 231 is connected through a grid resistance 235 to ground and the anode 236 is connected through a load resistance 237 to the positive terminal of a source 238 of operating current, the negative terminal of which source is grounded.

A second electron discharge device 239 has its cathode 240 connected directly with cathode 233 and its control electrode 241 connected through a grid resistance 242 to ground and also through a coupling condenser 243 to the ungrounded one of conductors 52 which, as shown in Figures 1 and 4, are connected with frequency divider 50. The anode 244 of device 239 is connected through a load resistance 245 to the anode 236 of device 232.

When vertical pulses are not present on conductors 49 in Figure 4, and the anode 167 of the discharge device 163 in the frequency divider 50 is at a high positive potential, the control electrode 241 of device 239 is near ground potential so that device 239 is conducting. In such case, the short steep sided pulses appearing between conductors 56 from the delay blocking oscillator 55 are impressed on control electrode 231 and hence appear on both of the cathodes 233 and 240 whereby the anode 244 of the device 239, varies in potential much more than the anode 236 of the device 232, and in the opposite phase. That is, the positive pulse appearing between conductors 56 during such times causes an increase in potential of cathode 240 and a corresponding increase in potential of anode 244 much greater than the decrease in potential of anode 236 so that the net potential change on anode 244 is in the positive direction.

At subsequent times when the frequency divider 50 is operating, and anode 167 of device 163 drops in potential, control electrode 241 cuts off current flow through device 239 and amplification of the pulses between conductors 56 is produced only through device 232. In such case, positive going narrow pulses between conductors 56 decrease the potential of anode 236 which, by reason of its connection through resistance 245 with anode 244 at the same time decreases the potential of anode 244.

Condenser 243 must be large in order that the time constant of that condenser and its associated resistances shall be large compared to the period of pulses appearing between conductors 52 from the anode 167 of the device 163 in the frequency divider 50. In other words, discharge device 239 must remain cut off entirely throughout each period when the anode 167 of device 163 is at reduced potential.

In summary, when there is no voltage between conductors 52, pulses between conductors 56 appear in the same polarity on conductor 57 which is connected with anode 244 of device 239, and when a negative potential pulse appears between conductors 52 to cut off the flow of discharge current through device 239, positive pulses between conductors 56 appear inverted as negative pulses on conductor 57. It should be noted that only one conductor 57 is shown in Figure 8 since the other conductor 57 shown in Figure 1 may be grounded and is therefore illustrated as ground in Figure 8.

The anode 244 of device 239 is connected through conductor 57 and then through a series combination of a condenser 246 and a resistance 247 to ground, the time constant of the condenser 246 and the associated resistances being small as indicated by the label "Differentiating circuit." In consequence, positive or negative going pulses appearing on the conductor 57 appear across the resistance 247 only as extremely short positive going pulses corresponding to the leading edge of a positive pulse on conductor 57 and extremely short negative going pulses corresponding to the trailing edge of positive pulses on conductor 57, or vice versa.

The blocking oscillator 58 shown in Figure 1 is illustrated in detail in Figure 8, and includes an electron discharge device 248, whose anode is connected through an inductance 249 with the positive terminal of source 238. A second inductance 250, magnetically coupled with the inductance 249, has one terminal connected to the control electrode 251 of device 248 and the other terminal connected to a point between condenser 246 and resistance 247. The cathode of device 248 is grounded and the control electrode 251 is connected through a relatively large fixed resistance 252 and a relatively small adjustable resistance 253, in series, to ground. Extremely short positive pulses appearing across resistance 247 trigger the discharge device 248, provided the adjustable resistance 253 is caused to make the blocking rate of the oscillator substantially equal to the recurrence rate of the narrow pulses appearing across resistance 247.

Since the blocking oscillator 58 including discharge device 248 should not be tripped to cause an output pulse between its control electrode 251 and its cathode until the appearance of an extremely narrow positive pulse across resistance 247, the resistance 253 should be adjusted so that the blocking rate is somewhat lower than the rate of recurrence of positive pulses across resistance 247.

The rate of recurrence of positive pulses across resistance 247 depends on the presence or absence of voltage between conductors 52, since horizontal pulses appearing between conductors 56 appear on conductor 57 either in upright or inverted phase depending on the presence or absence of potential between conductors 52. When pulses appear on conductor 57 with such polarity that the leading edge produces a positive pulse across resistance 247, the blocking oscillator 424 fires earlier than it does when pulses on conductor 57 are negative going, since the positive pulse across resistance 247 in that case corresponds with the trailing edge of the negative going pulse on conductor 57.

In consequence, horizontal scanning of the picture is caused to begin sooner or later in correspondence with the absence or presence of voltage between conductors 52.

The result of the arrangement shown in Figure 1, and the following described figures is to produce a television signal which is altered at random times in two different manners.

For certain intervals the television signal is not altered at all, while in alternate intervals the television signal is altered both by having its video information turned upside down and recurrently moved back and forth horizontally in time and by an amount corresponding to the adjustment of resistance 228 of the delay blocking oscillator 55 shown in Figure 7. The recurrent change of timing produced by the delay blocking oscillator 55 and inverter switch 53, as described, in effect produces a recurrent change in the time relation between video signals on the one hand and horizontal synchronizing pulses and horizontal pedestals on the other hand. It is, however, entirely within the scope of the invention to produce that recurrent change in time rate between the horizontal synchronizing signals on the one hand and the video signals and horizontal pedestals on the other hand.

It is similarly within the scope of the invention to alter the time relation between the vertical synchronizing signals and the remainder of the picture signal.

While the arrangement has been described specifically as connected with a telephone network, for convenience in channeling the tone frequency signal to the desired locations, it is necessary only that the tone frequency signal be channeled over some wire connection to the point where the signal is desired to be used, and that some means be provided for indicating the times when the tone frequency signal on such wire connection is being used. That is, it is entirely within the scope of the invention to transmit the tone frequency signals over 60 cycle power mains from which it may be taken and used in the receiver to reconstruct the picture received over the air, suitable meters being arranged to indicate for each receiver how long the tone frequency signal current flows from the power line to that particular receiver.

Furthermore, it is within the scope of the invention to transmit the tone frequency signal by modulating it on a carrier wave conducted through wire lines, where preferable.

Figure 9:
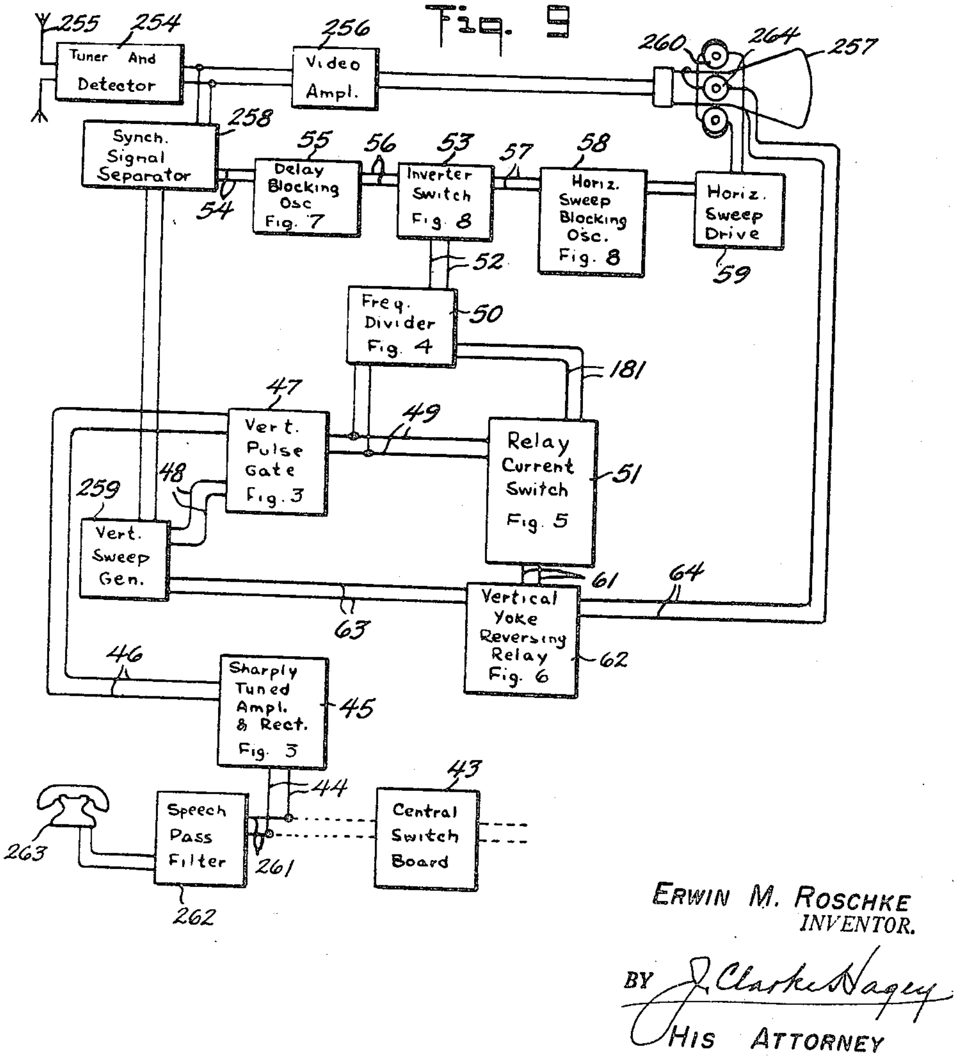
Figure 9 illustrates an image receiver arranged especially for operation with the embodiment of Figure 1.

In Figure 9 a receiver is illustrated suitable for receiving and reproducing the signal transmitted by the transmitter of Figure 1. In this receiver many of the elements are utilized as shown in Figure 1 and described in detail in relation to Figures 2 through 8. Throughout this application, like reference numerals are applied to similar elements illustrated in different figures. A tuner and detector 254 is connected with an antenna 255 to receive, tune and detect radiated signals, and the output is amplified through a video amplifier 256 and impressed between the grid and the cathode of a kinescope or picture tube 257. The output of the tuner and detector 254 is also impressed on the synchronizing signal separator 258 constructed in usual fashion, the synchronizing signals from the synchronizing signal separator being then impressed on a vertical sweep generator 259 of normal construction. Horizontal synchronizing signals from the separator 258 are impressed through conductors 54 on the delay blocking oscillator 55 which is connected in exactly the same fashion as shown in Figures 1 through 8 with an inverter switch 53, a horizontal sweep blocking oscillator 58 and a horizontal sweep drive 59, which is connected with horizontal sweep coils 260 associated with the kinescope 257 to cause horizontal traces and retraces of the electron beam in the kinescope 257.

The central switchboard 43 is connected through a telephone line 261 with a speech pass filter 262 and in turn with a telephone set 263, the speech pass filter 262 being arranged to exclude from the telephone set 263, tone frequency signals appearing on the telephone line 261.

The sharply tuned amplifier and rectifier 45 is connected through conductor 44 to the telephone line 261 so that it amplifies and rectifies the tone frequency signal while excluding speech telephone signals intended for the telephone set 263, and operates the vertical pulse gate 47 through conductors 46. Conductors 48 of vertical pulse gate 47 are connected with the vertical sweep generator 259 from which vertical blanking pulses are transmitted to the vertical pulse gate 47, instead of vertical synchronizing pulses as was the case in the transmitter. Gated vertical blanking pulses are transferred from gate 47 through conductors 49 to frequency divider 50 and the relay current switch 51. The relay current switch 51 in the presence of the gated vertical blanking pulses operates the vertical yoke reversing relay 62 through conductors 61 to reverse the polarity of the sweep current from generator 259 transmitted through conductors 63 and 64 to the vertical sweep coils 264 associated with the kinescope 257. Pulses of divided frequency from the divider 50 are transmitted through conductors 52 to the inverter switch 53 to operate it in the same fashion as in the transmitter, and the frequency divider 50 is connected through conductors 181 to the relay current switch 51 in the same fashion as in the transmitter to cause the frequency divider to operate the inverter switch 53 in the proper fashion at the end of each interval of its operation.

Because the circuit arrangements utilized in the receiver for realtering the picture signals to reproduce the picture correctly are substantially a duplicate of the circuit arrangements used in the transmitter to alter the picture signals originally, the realterations or corrections in the picture signals are made in the receiver with the result that an excellent picture is reproduced and with the further result that without the proper tone frequency signal from the telephone line 261, the picture could be reproduced only with extreme difficulty if at all.

Figure 10:
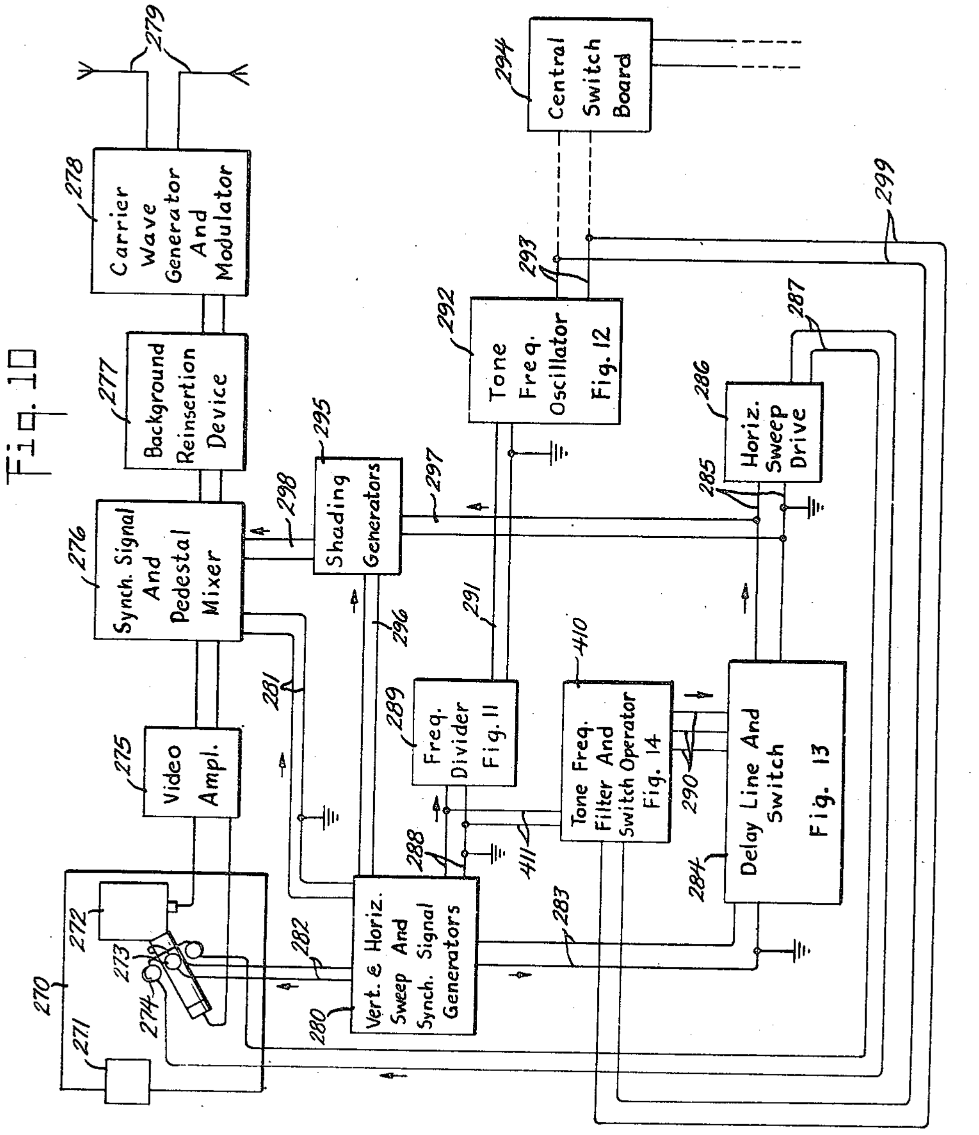
Figure 10 illustrates an alternative form of image transmitter arranged according to the invention.

In Figure 10 there is illustrated an image transmitter which transmits a key signal over a wire line conductor and an image signal altered only by changing the time relations between the video signals and the synchronizing signals. In this arrangement, a television camera 270 contains the usual lens system 271 for focusing an image upon an iconoscope or image orthicon 272 which is provided with the usual vertical scanning coil 273 and horizontal scanning coil 274. Video signals developed by the iconoscope 272 are amplified through a video amplifier 275 and are subsequently transmitted through a synchronizing signal and pedestal mixer 276 in which appropriate pedestals and synchronizing signals are added to the video signals to produce the desired program signals. The program signal is then transmitted to a background reinsertion device 277 to a carrier wave generator and modulator 278 in which the program signal, appropriately adjusted as to background level, is modulated on a carrier wave which is radiated from an antenna 279.

Normal vertical and horizontal synchronizing signals and normal vertical sweep signals are generated by vertical and horizontal sweep and synchronizing signal generators 280 and are impressed respectively on conductors 281 and 282, which conductors are connected respectively with the synchronizing signal and pedestal mixer 276 and the vertical scanning coils 273 associated with the iconoscope 272. The horizontal signal is fed from the vertical and horizontal sweep and synchronizing signal generators 280 through conductors 283 to a delay line and switch 284, from which such signals altered in accordance with the invention are then fed through conductors 285 to a horizontal sweep drive 286 of normal construction, and from thence through conductors 287 to the horizontal sweep coils 274 associated with the iconoscope 272. In order to perform the desired alterations of the horizontal signal in the delay line and switch 284 at properly timed intervals, positive going vertical pulses from the vertical and horizontal sweep and synchronizing signal generators 280 are impressed through conductors 288 on a frequency divider 289 which produces on conductors 291 pulses of lower frequency than the positive going vertical pulses from generators 280. Such lower frequency pulses are impressed through conductors 291 on a tone frequency oscillator 292 which produces alternate bursts of oscillations of source frequency suitable for transmission by wire line conductor to receivers. These bursts of oscillations coincide in time with the lower frequency pulses, existing only when such lower frequency pulses are of one polarity. These bursts of tone frequency oscillations are impressed on conductors 293 which are connected to a central switchboard 294 in the system of wire line conductors, which may be, for example, connected in a telephone system.

Conductors 299 are connected with conductors 293 at one end and at the other end are connected to supply such tone frequency oscillations to a tone frequency filter and switch operator 410, which is also supplied with positive going vertical pulses from conductors 288 through conductors 411. This tone frequency filter and switch operator, in the presence of such tone frequency oscillations, utilizes the positive going vertical pulses to impress pulses balanced with respect to ground on conductors 290, the frequency of such balanced pulses being a submultiple of the vertical pulses on conductors 288. The balanced pulses on conductors 290 are impressed on the delay line and switch 284 to cause it to change the timing of horizontal pulses passing from conductors 283 to conductors 285 during recurrent intervals whose frequency is a submultiple of the vertical pulses from the generators 280.

Accordingly, at each time when a change is made in the transmission of horizontal pulses from conductors 283 through the delay line and switch 284 to conductors 285, such change is indicated as may be desired, either by the presence or absence on the telephone line conductors 293 of the tone frequency oscillations from oscillator 292.

As explained in connection with Figures 1 through 9, such tone frequency oscillations on the telephone conductors 293 are transmitted by those conductors to a central switchboard 294 from which the oscillations may be distributed upon making a charge therefore to any subscriber who desires the service. Also as previously explained, the conductors 293 while illustrated as forming a part of the telephone system may instead be connected with power lines in connection with which provision is made for making a charge to a subscriber whenever tone frequency oscillations are taken from such lines.

When, in the arrangement of Figure 10, an iconoscope requiring shading voltages is used in camera 270, it is desirable that the shading generators be supplied with normal vertical synchronizing signals from generators 280 and with horizontal synchronizing signals from the delay line and switch 284. For this purpose, a rectangle 295 is illustrated bearing the label "Shading generators," connected with the vertical and horizontal sweep and synchronizing signal generators 280 through conductors 296, and connected with conductors 285 through conductors 297. The shading generators 295 may be of any standard type capable of producing both vertical and horizontal shading voltages as required, provided the horizontal shading voltage generators have a sufficiently short time constant to change phase within the time of one or two horizontal lines when the phase of horizontal synchronizing signals on conductors 285 changes.

The mixed horizontal and vertical shading voltages from generators 295 are mixed with the composite signal in the mixer 276, to which they are supplied through conductors 298.

Figure 11:
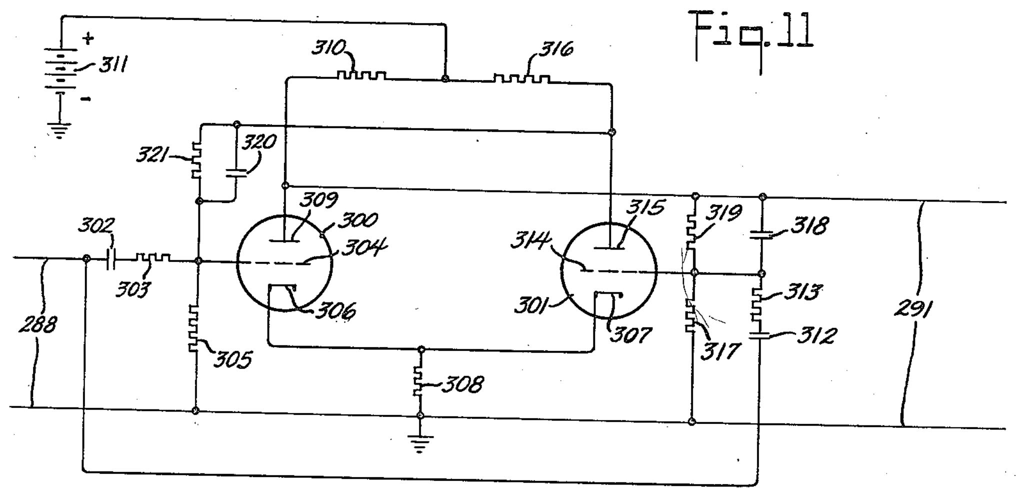
Figures 11, 12 and 13 illustrate certain detailed circuit arrangements forming portions of Figure 10.

In Figure 11 the circuit details of the frequency divider 289 are illustrated, although that frequency divider is very similar in most respects to one of the two frequency dividers illustrated in Figure 4. It is, however, necessary in the arrangement of Figure 10 only to have the frequency divider 289 operate at any desired submultiple frequency of the frequency of positive going vertical pulses on conductors 288.

In this figure the frequency division is accomplished by the connection of two electron discharge devices 300 and 301 in such a way that one remains conductive and the other remains nonconductive until the appearance between conductors 288 of the positive going pulse, after which the other discharge device becomes conductive and the one remains non-conductive until the subsequent appearance of another positive pulse between conductors 288. While the frequency divider illustrated in Figure 11 is capable of producing pulses on conductors 291 whose frequency is one-half that of the frequency of pulses on conductors 288, it is a very simple matter to produce pulses of any other desired integral frequency relation by the inter-position in conductors 288 of one or more cascade connected blocking oscillators of the type illustrated in Figure 7, adjusted to increase or decrease the pulse frequency as desired.

As illustrated, one of the conductors 288 is connected to ground and one of conductors 291 is connected to ground, the ungrounded one of conductors 288 being connected through a series combination of a condenser 302 and a resistance 303 to the control electrode 304 of device 300. A grid resistance 305 is connected between control electrode 304 and ground and the cathode 306 of device 300 is connected directly with the cathode 307 of device 301, both cathodes being connected through a common resistance 308 to ground. The anode 309 of device 300 is connected through a suitable load resistance 310 to the positive terminal of a source 311 of operating potential, the negative terminal of which source is grounded.

The ungrounded one of conductors 288 is also connected through a series combination of a condenser 312 and a resistance 313 to the control electrode 314 of device 301. The anode 315 of device 301 is connected through a suitable load resistance 316 to the positive terminal of source 311. A grid resistance 317 is connected between the control electrode 314 of device 301 and ground.

In order that the circuit arrangement shall remain with one of the devices 300 and 301 conductive and the other non-conductive until the appearance of a succeeding positive going pulse between conductors 288, the anode 309 of device 300 is connected through a parallel combination of a condenser 318 and a resistance 319 to the control electrode 314 of the device 301, and similarly the anode 315 of device 301 is connected through a parallel combination of a condenser 320 and a resistance 321 to control electrode 304 of device 300.

The ungrounded one of conductors 291 is connected directly to anode 309 of device 300. The device in general works in much the same manner as explained for either one of the frequency dividers of Figure 4, so that the ungrounded conductor 291 during recurring alternating periods remains at the two different potentials. In one such period, the ungrounded conductor 291 is at a maximum positive potential near the potential of the source 311, while during the alternate one of the recurrent periods the ungrounded conductor 291 is at a much smaller positive potential.

Figure 12:
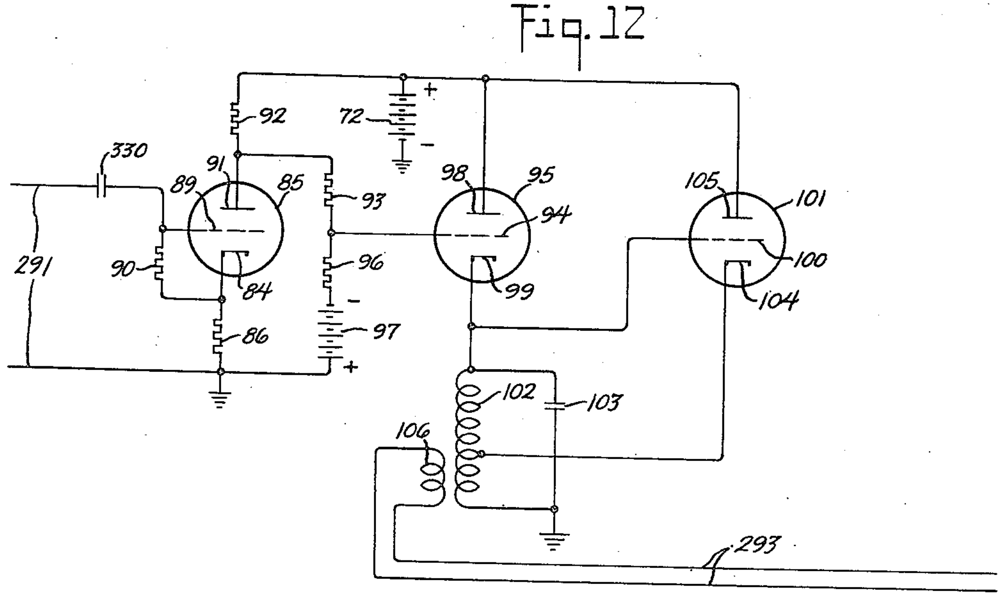

In Figure 12 a convenient form of tone frequency oscillator is illustrated which is quite similar in many respects to that illustrated in Figure 2. Accordingly, similar parts have been given like reference numerals and the operation of the circuit is described only in so far as it differs from the operation of the similar type of the circuit shown in Figure 2.

The ungrounded conductor 291 is connected through a coupling condenser 330 to the control electrode 89 of the discharge device 85.

The time of the coupling condenser 330 together with associated resistances and particularly the grid resistance 90 should be made sufficiently long that tone frequency oscillations continue to be produced and impressed on the wire line conductors 293 so long as the ungrounded conductor 291 is at maximum positive potential, and so that tone frequency oscillations are not produced so long as ungrounded conductor 291 is at any substantially less positive potential. Conductors 291 are the same as the conductors 291 of Figures 10 and 11.

Figure 13:
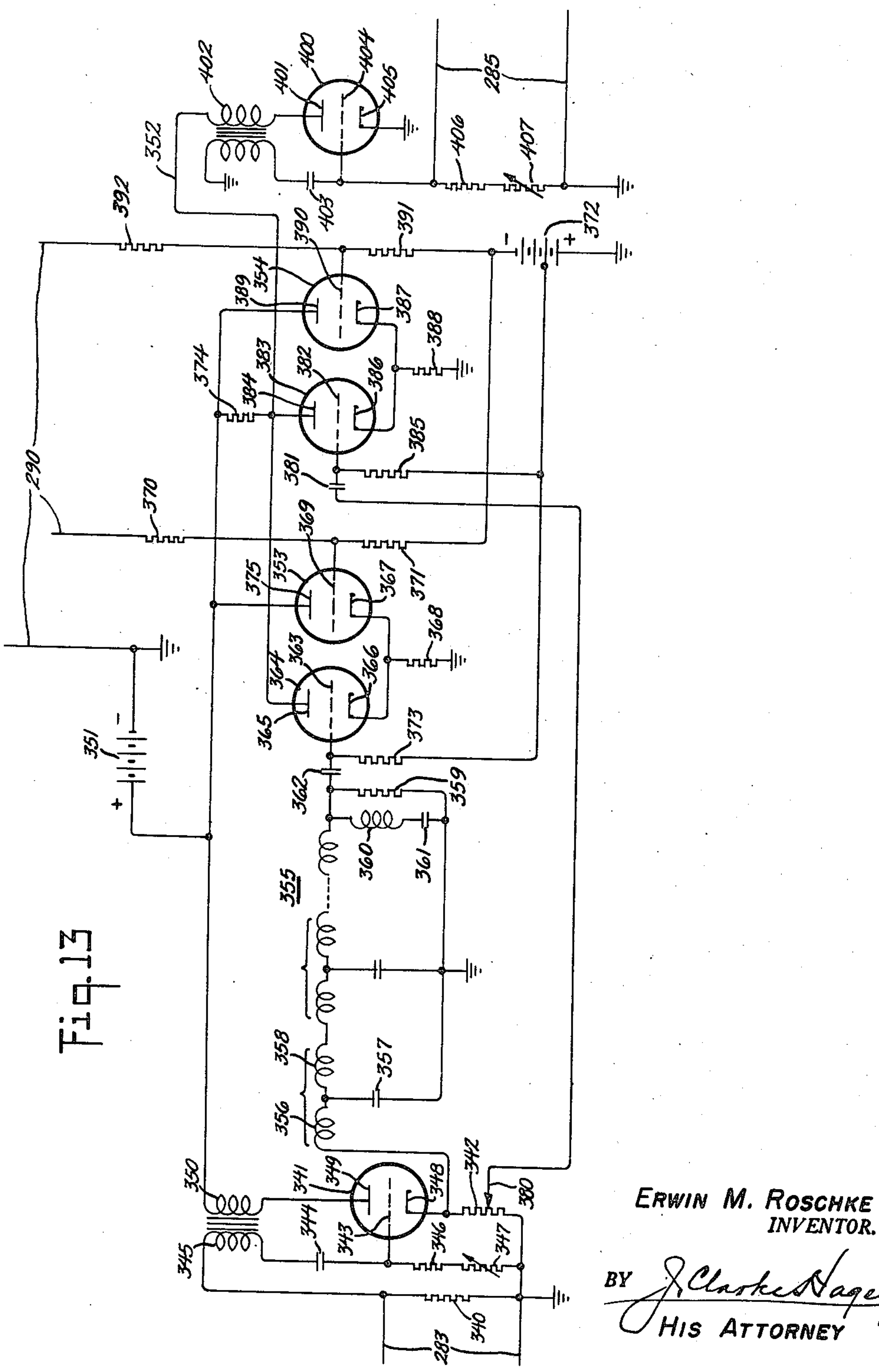

In Figure 13 the details of the delay line and switch 284 are illustrated. One of the conductors 283 is grounded and the other is connected through a load resistance 340 to ground. Horizontal pulses impressed across the resistance 340 are made square by a blocking oscillator including an electron discharge device 341 and are impressed across the low impedance output resistance 342. For that purpose, the control electrode 343 of device 341 is connected through a condenser 344 and the primary 345 of a transformer, in series, to the ungrounded one of conductors 283. The control electrode 343 is also connected serially through a resistance 346 and a somewhat smaller adjustable resistance 347 to ground. The cathode 348 of device 341 is connected through the low impedance resistance 342 to ground, and the anode 349 of device 341 is connected through the secondary 350 of the transformer whose primary is 345 to the positive terminal of a source 351 of operating potential, the negative terminal of which source is grounded.

So connected, the blocking oscillator including discharge device 341 may be adjusted as to the rate of repetition by adjustment of resistance 347 to synchronize with pulses impressed between conductors 283 from the generators 280 and produce square pulses at low impedance across resistance 342.

The square pulses appearing across the small resistance 342 are transferred through one or the other of two different paths to a conductor 352, transmission between one or the other of these paths being controlled in accordance with the voltages on two ungrounded conductors 290 by means of a pair of electron discharge devices 353 and 354, which devices act as switches. One of the two paths contains substantially no time delay in transmission, while the other of the two paths contains the delay line 355 constructed to produce a predetermined amount of time delay in any signal transmitted through it.

The delay line 355 includes a number of iterative sections, each section being in the form of a T with the vertical leg of the T including a condenser connected at its lower terminal to ground and at its upper terminal to the junction of two inductances forming the horizontal arms of the T. The two inductances are coupled magnetically in predetermined amount so that the time delay in transmission of any wave through the iterative sections, properly terminated, is constant at any frequency within the band of frequencies to be transmitted. The first such section, as illustrated, includes an inductance 356, of which one terminal is connected to the cathode 348 and the other terminal is connected through a condenser 357 to ground. The other terminal is also connected through a second inductance 358 to a succeeding section of the delay line. The two inductances 356 and 358 are magnetically coupled as above stated.

Succeeding ones of the iterative sections are similar, and the last one of these sections is terminated by a terminating resistance 359, connected in shunt with a serial combination of an inductance 360 and a condenser 361. It is necessary to terminate the delay line in its characteristic impedance, or surge impedance, in order that there shall be no reflection back through it of waves transmitted through it in a forward direction.

Time delayed pulses appearing across the resistance 359 are impressed through a coupling condenser 362 on the control electrode 363 of an electron discharge device 364, the anode 365 of which is connected with conductor 352. The cathode 366 of device 364 is connected directly with the cathode 367 of device 353, and both cathodes are connected through a resistance 368 to ground. The control electrode 369 of device 353 is connected through a resistance 370 to one of the two ungrounded conductors 290, and is also connected through a grid resistance 371 with the negative terminal of a source 372 of negative bias potential, the positive terminal of which source is grounded.

The control electrode 363 of device 364 is also connected through a grid resistance 373 to a tap on source 372 of less negative potential with respect to ground than the negative terminal to which resistance 371 is connected. Anode 365 of device 364 is also connected through a suitable load resistance 374 to the positive terminal of source 351, and the anode 375 of device 353 is connected directly to the positive terminal of source 351.

In consequence, when that one of conductors 290 which is connected through resistance 370 to the control electrode 369 is most positive, control electrode 369 is made highly positive with respect to ground and maximum anode and cathode current flows through device 353, with the result that cathodes 366 and 367 are sufficiently positive with respect to ground that the flow of space current through discharge device 364 is entirely cut off. In that condition, pulses delayed in time and appearing across resistance 359, although they appear on control electrode 363 of device 364, are not impressed on conductor 352.

During alternate periods when that one of the conductors 290 is least positive, bias potential from the source 372 is sufficiently great that control electrode 369 entirely cuts off the flow of space current through device 353, with the result that cathodes 366 and 367 drop nearly to ground potential and space current flows through device 364. In consequence, pulses appearing across resistance 359, delayed in time, are amplified through device 364 and are impressed on conductor 352.

In a similar fashion pulses which are not delayed in time are impressed on conductor 352 when the other one of the ungrounded conductors 290 is least positive. For that purpose, resistance 342 is provided with a moveable tap 380 which is connected through a coupling condenser 381 to the control electrode 382 of an electron discharge device 383, whose anode 384 is connected to the conductor 352. The control electrode 382 is also connected through a grid resistance 385 to the tap on source 372 to which resistance 373 is connected, and the cathode 386 of device 383 is connected directly with the cathode 387 of device 354, both cathodes being connected to ground through a resistance 388. The anode 389 of device 354 is connected directly to the positive terminal of source 351 and the control electrode 390 of device 354 is connected through a grid resistance 391 to the negative terminal of source 372. The control electrode 390 is also connected through a resistance 392 to the other one of the ungrounded conductors 290.

The devices 383 and 354 operate in exactly the same way as the devices 364 and 353, respectively, so that horizontal pulses undelayed in time from resistance 342 are impressed on conductor 352 whenever that one of the ungrounded conductors 290 which is connected to resistance 392 is at a voltage substantially less than its maximum positive potential.

In other words, depending upon the voltage relation between the ungrounded conductors 290, horizontal pulses appear on conductor 352 which are either undelayed in time or which are delayed by transmission through the delay line 355. Since there is inevitably some small loss in amplitude in pulses transmitted through the delay line 355, a corresponding reduction in the amplitude of pulses transmitted through the undelayed path is produced by adjustment of the tap 380 on resistance 342.

Horizontal pulses, delayed or undelayed, which appear on conductor 352 are reshaped in a blocking oscillator including an electron discharge device 400 and are impressed between conductors 285, of which one is grounded. For that purpose, the anode 401 of device 400 is connected through the primary 402 of a transformer to conductor 352, and the secondary of the transformer has one terminal grounded and the other connected through a coupling condenser 403 to the control electrode 404 of device 400. The cathode 405 of device 400 is grounded. The ungrounded one of conductors 285 is connected with the control electrode 404 of device 400, and a fixed resistance 406 is connected serially with an adjustable resistance 407 between the two conductors 285. Adjustment of the resistance 407 adjusts the rate of operation of the blocking oscillator so that it operates properly to reproduce the pulses impressed on conductor 352.

Figure 14:
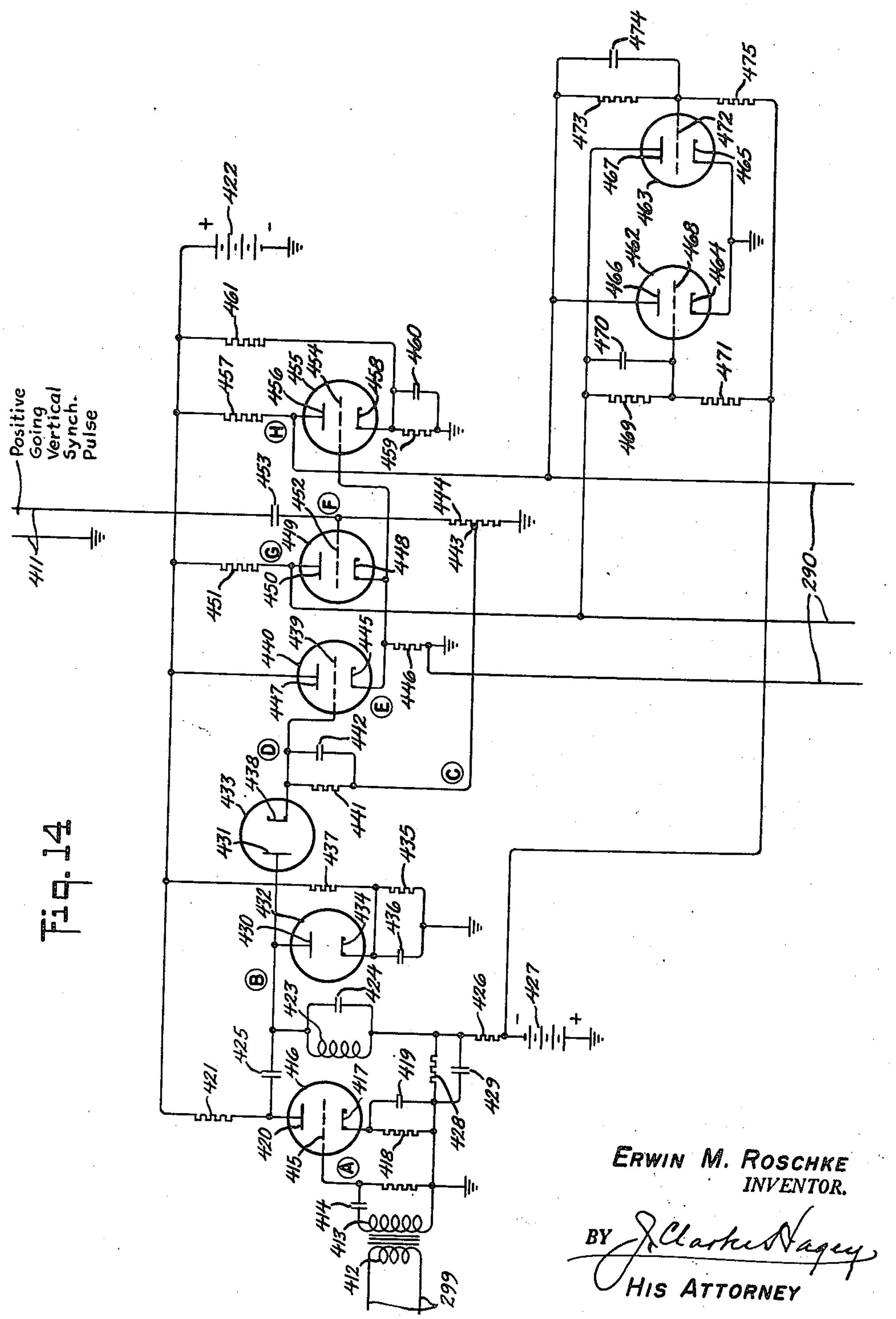
Figure 14 illustrates an image receiver arranged especially for use with the image transmitter of Figure 10.

In Figure 14, the circuit details of the tone frequency filter and switch operator 410 are illustrated. The two conductors 299 are connected together through the primary 412 of a transformer whose secondary 413 is connected at one terminal to ground and at the other terminal through a coupling condenser 414 to the control electrode 415 of an electron discharge amplifying device 416. The cathode 417 of device 416 is connected to ground through a parallel combination of a resistance 418 and condenser 419 to provide proper amplifying bias. The anode 420 of device 416 is connected through a suitable load resistance 421 to the positive terminal of a source 422 of operating potential, the negative terminal of which source is grounded.

Amplified tone frequency oscillations on the anode 420 of device 416 are impressed on a circuit resonant to the frequency of those tone frequency oscillations, such circuit including an inductance 423 connected in shunt with a condenser 424, one terminal of the circuit being coupled through a coupling condenser 425 to the anode 420, and the other terminal of the tuned circuit being connected through a resistance 426 to the negative terminal of a souce 427, the positive terminal of which source is grounded. This other terminal of the tuned circuit 423, 424, is also connected through a parallel combination of a resistance 428 and a condenser 429 to ground.

The one terminal of the tuned circuit 423, 424, connected with the coupling condenser 425, is also connected with the two anodes 430 and 431 of a pair of diode rectifier devices 432 and 433. The cathode 434 of device 432 is connected through a parallel combination of a resistance 435 and the condenser 436 to ground, and is also connected through another resistance 437 to the positive terminal of source 432.

Negative bias potential from the source 427, divided across resistances 426 and 428, is therefore impressed on anode 430 of the rectifier device 432, while positive bias potential is at the same time impressed on cathode 434 by potential division across resistances 437 and 435. Both of these bias potentials prevent device 432 from conducting until its anode is made positive with respect to its cathode and both of those bias potentials tend to prevent such action. The two bias potentials are sufficient to prevent the rectifier 432 from conducting until the tone frequency oscillations appearing across the tuned circuit 423, 424, are quite large, and preferably in the order of 20 volts. The rectifier 432, therefore, operates to prevent overloading of the circuit by very strong tone frequency oscillations from the conductors 299.

The rectifier device 433 is utilized to rectify the tone frequency oscillations appearing across tuned circuit 423, 424, provided those oscillations are of greater than a predetermined minimum amplitude. For that purpose, cathode 438 of device 433 is connected directly with control electrode 439 of an electron discharge device 440, and is also connected through a parallel combination of a load resistance 441 and a condenser 442 to a tap 443 on a resistance 444, of which one terminal is grounded. Bias potential from source 427 therefore tends to maintain anode 431 of the device 433 negative with respect to the cathode 438, and this bias potential is adjusted so that device 433 will not rectify in the presence of extraneous voltages, such as noise, but so that it will rectify in the presence of any tone frequency oscillations on conductors 299. When the device 433 rectifies such amplified tone frequency oscillations, a continuous potential is developed across resistance 441 by such rectification which tends to make the control electrode 439 of the discharge device 440 positive with respect to ground. The cathode 445 of device 440 is connected to ground through a resistance 446, and the anode 447 of device 440 is connected directly to the positive terminal of source 422. In consequence, when the rectifier 433 produces a continuous potential across resistance 441, so as to make control electrode 439 positive with respect to ground, cathode 445 increases in potential and correspondingly increases the potential above ground of cathode 448 of discharge device 449 with which cathode 445 is directly connected. The anode 450 of device 449 is connected directly with one of the ungrounded conductors 290, and is also connected through a suitable load resistance 451 to the positive terminal of source 422. The control electrode 452 of device 449 is connected through resistance 444 to ground, and is also connected through a coupling condenser 453 to the ungrounded one of conductors 411, the other of the conductors 411 being grounded.

Cathodes 445 and 448 of the discharge devices 440 and 449 are also connected directly with the control electrode 454 of an electron discharge device 455 whose anode 456 is connected with the other one of the ungrounded conductors 290. Anode 456 of discharge device 455 is also connected through a suitable load resistance 457 to the positive terminal of source 422. Cathode 458 of discharge device 455 is connected to ground through a parallel combination of a resistance 459 and a condenser 460, and is also connected through a resistance 461 to the positive terminal of source 422.

In order to make the two devices 449 and 455 alternately conducting in response to the existence or non-existence of tone frequency oscillations on conductors 299, two additional electron discharge devices 462 and 463 are connected with the ungrounded conductors 290. The cathodes 464 and 465 of the devices 462 and 463 are grounded, and the anodes 466 and 467 of the respective devices 462 and 463 are connected respectively with the anodes 456 and 450 of the devices 455 and 449. The control electrode 468 of device 462 is connected through a parallel combination of a resistance 469 and a condenser 470 to the anode 467 of device 463, and is also connected through a grid resistance 471 to the negative terminal of source 427. Similarly, the control electrode 472 of device 463 is connected through a parallel combination of a resistance 473 and a condenser 474 to the anode 466 of device 462, and is also connected through a grid resistance 475 to the negative terminal of source 427.

Figure 16:
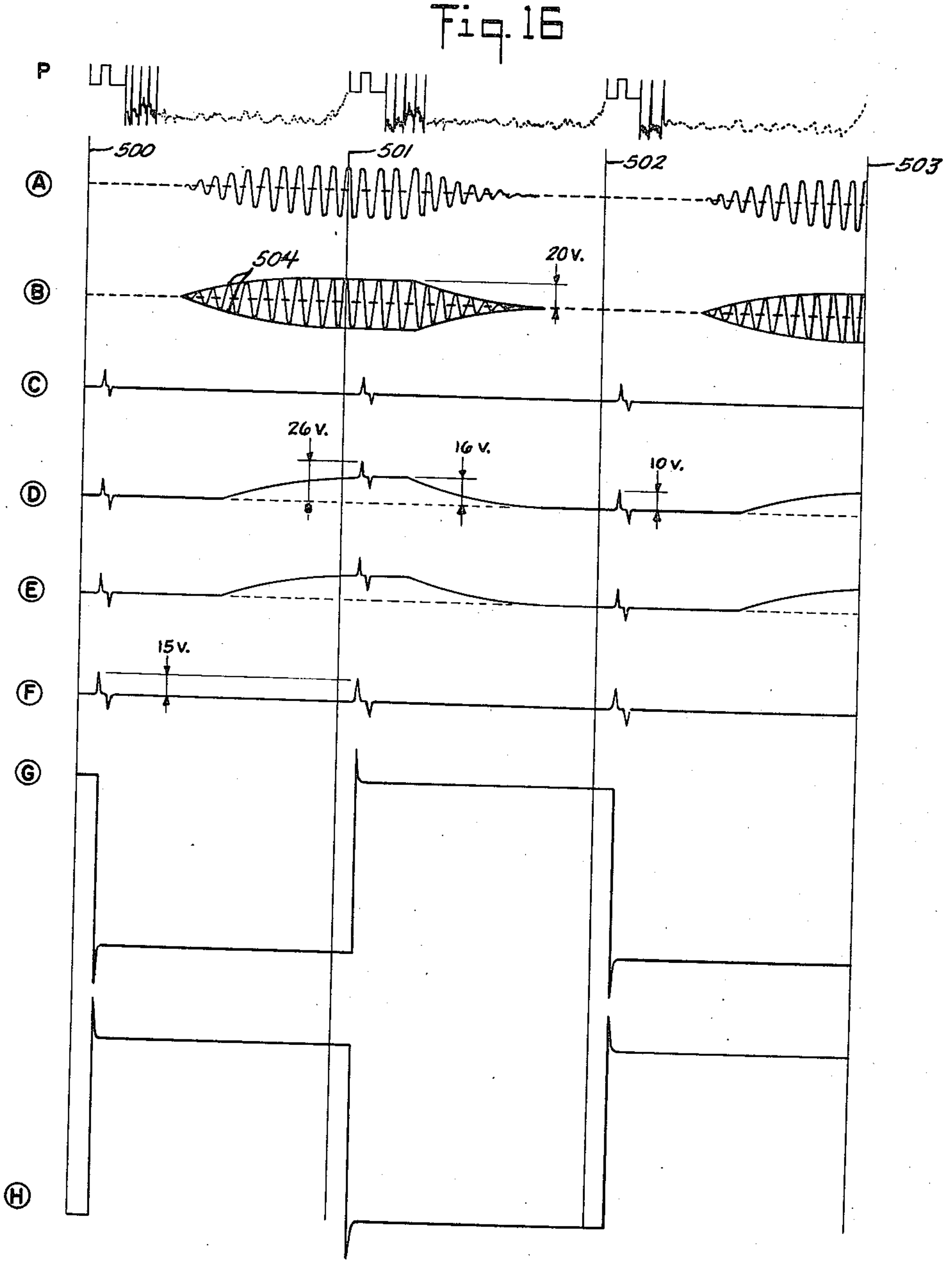
Figure 16 illustrates certain characteristics of a system including the image transmitter of Figure 10 and the image receiver of Figure 14.

The operation of the circuit arrangement of Figure 14 is more readily understood by reference to the operating characteristics illustrated in Figure 16. In this figure there is a number of curves, of which the first curve marked P is intended to illustrate the wave shape of the radiated program signal. This program signal is in no readily apparent way different from the present day standard television signal insofar as vertical and horizontal pedestals and vertical and horizontal synchronizing signals are concerned, and between horizontal pedestals there are video signals which appear normal in every respect. However, these video signals are recurrently shifted back and forth in time relation with respect to the pedestals and synchronizing signals, preferably in an entirely random manner.

In Figure 16, vertical lines 500, 501, 502, and 503 are drawn in coincidence with the leading edge of succeeding vertical synchronizing signals and pedestals, and are intended to show clearly the time relation between the program signal and the various signals indicated by the succeeding curves A through H.

Curve A is intended to illustrate the voltage which exists at the point marked A on Figure 14, that is, the tone frequency oscillations which exist on the telephone line conductors 299. Such tone frequency oscillations, as suggested previously, may be transmitted at frequencies in the order of 500 to 15,000 cycles and excellent results have been observed when they are transmitted at a frequency of 2500 cycles, suitable filters being provided in connection with telephone sets so that the 2500 cycle oscillations are not heard in carrying on telephone conversations. For purposes of clarity, however, only a small number of cycles are shown in curve A.

It must be remembered that there is a finite time required for transmission from the transmitter to the receiver of the radiated program signal and a finite time for the transmission from the transmitter through the wire line conductors of the tone frequency oscillations to the receiver, the latter time usually being longer than the time for transferring the radiated signal. The difference in time between the two transmission paths is, however, generally a very small part of the time represented by the distance between two of the vertical lines 500, 501, 502, and 503, and the tone frequency oscillation wave A may be considered as beginning at the transmitter and the receiver at practically the same time for purposes of understanding this particular circuit arrangement. The beginning of the wave A follows by a slight interval at the transmitter the end of a vertical pedestal, as illustrated, and may continue for one or more frames as desired. In order to avoid large drawings, it is illustrated as continuing for only a little more than one frame. The wave A ends a small time later, within one frame time, than a vertical pedestal beginning that frame. A succeeding burst of the tone frequency oscillations may begin at any time one or more frames later, a short time after the end of the vertical pedestal and may, in turn, continue through one or more frames. As explained previously, the alteration of the time relation between video signals and horizontal and vertical synchronizing signals and pedestals and the program signal should be more or less at random and the tone frequency oscillation wave A must likewise be more or less at random. For the curves P and A illustrated, the relation between video signals and synchronizing signals, in the time between line 500 and line 501 may be considered as a standard condition, and the beginning of tone frequency oscillations during the time of transmission of those signals between lines 500 and 501 indicates that the following frame between lines 501 and 502 will be altered in that the time relation between the video signals and the synchronizing signals is altered to a different condition between the time indicated by line 501 and the time indicated by line 502. On the other hand, the ending of the tone frequency oscillation shown by wave A between lines 501 and 502 indicates that the time relation between video signals and synchronizing signals will again be normal or of standard condition in the frame beginning at line 502 and ending at line 503. It should, of course, be understood that the standard or normal condition of time relation between video signals and synchronizing signals may be represented either by the presence or absence of the tone frequency oscillations illustrated by curve A.

The receiver senses the prediction of a change in such time relation by observing the tone frequency oscillations indicated by wave A and operating in response to that in the following manner to make a correction in the receiver for such changed time relation. The wave A as impressed at the transmitter on the wire line conductors appears at the receiver a short time later. The receiver is equipped with a tone frequency filter and switch operator similar to that shown in Figure 14, and the wave A is amplified through the discharge device 416 to appear across the tuned circuit 423, 424 at point B as indicated by the curve B of Figure 16. At curve B the envelope 504 is shown to indicate that the tuned circuit 423, 424 is excited into oscillation at full amplitude only after the reception of several cycles of the tone frequency oscillation, and that such oscillations are damped out and disappear several cycles after the disappearance of the tone frequency coming from the transmitter.

Now, before explaining the operation of rectifier 431 upon the wave of curve B, it should be stated that across the output load resistance 441 there is developed a rectified voltage from the tone frequency oscillations of wave B, but also there is impressed on the lower terminal of the resistance 441 a voltage of shape and time relation indicated by curve C. This voltage is derived as explained hereafter from positive going vertical synchronizing pulses on conductors 411, and should be in the order of 10 volts when other conditions are as described. It should be understood of course, that all voltage and other circuit relations may be adjusted within wide limits to operate quite satisfactorily and that particular values are set forth only as those which have been tried and found to be suitable.

By stating that curve C represents a wave of 10 volts amplitude, it is intended to mean that the positive going peaks are 10 volts above the average voltage level, it being of little or no consequence what the negative going peaks of the wave C may be since they are not utilized. The tone frequency oscillations should be about 40 volts peak to peak as shown by curve B, and when rectified through rectifier 433 cause a composite voltage to appear at point D as represented by curve D of Figure 16. This composite voltage has positive peaks in the order of 10 volts above the average voltage level when no tone frequency oscillations are received, and also has positive voltage peaks about 26 volts above the average voltage level when tone frequency oscillations are received and rectified.

The discharge device 440 operates largely as a cathode-coupled amplifier and causes the voltage of cathode 445 at point E to be substantially the same as that represented by curve E of Figure 16.

Now at point F in Figure 14, the voltage on the control electrode 452 of discharge device 449 is as represented by curve F of Figure 16, and is derived from positive going vertical synchronizing pulses on conductor 411, impressed through coupling condenser 453 across resistance 444. The condenser 453 should be sufficiently small that the vertical synchronizing pulses on conductors 411 are "differentiated" so that instead of appearing across resistance 444 as square pulses, they appear instead as sharp pulses of very short duration going positive in correspondence with the leading edge of vertical synchronizing pulses and as succeeding negative going sharp pulses corresponding in time to the trailing edge of vertical synchronizing pulses. These pulses represented by the curve F should be about 15 volts in amplitude to the positive peak measured from the average voltage level, and it is these same pulses at point F which are reduced in amplitude by the tap 443 on resistance 444 to about two-thirds amplitude so as to appear at point C in Figure 14.

Now assuming that no tone frequency oscillations exist on conductors 299 for several frames and that positive going vertical synchronizing pulses appear between conductors 411, the following actions take place.

There is no voltage across resistance 441, and in response to one of the vertical synchronizing pulses a 15 volt positive pulse appears on control electrode 452 and a 10 volt positive pulse on control electrode 439. The two discharge devices 440 and 449 being of similar characteristics, space current flowing through the device 449 is greater than that through device 440 by reason of the larger amplitude positive pulse of control electrode 452. In consequence, most of the space current flowing through resistance 446 flows through discharge device 449 and through its load resistance 451 with the result that the anode 450 is reduced in potential a considerable amount, and since it is connected through a coupling condenser 470 with the control electrode 468 of the discharge device 462, control electrode 468 tends to become negative and stop the flow of space current through device 462. Immediately anode 466 rises in potential and through coupling condenser 474 tends to increase the potential of control electrode 472 to cause discharge device 463 to draw large amounts of space current, since cathode 465 is grounded, so that anode 467 rapidly drops in potential and further reduces the potential of control electrode 468 so that the action is cumulative. The end result is that space current ceases flowing through discharge device 462 and a maximum amount of space current flows through device 463, so long as no succeeding pulse appears to reverse the action. Anode 467, drawing large amounts of space current through resistance 451, greatly reduces the potential of anode 450 of discharge device 449, and because cathode 448 of discharge device 449 is maintained positive with respect to ground by discharge current flowing through device 440, through resistance 446, the discharge device 449 thereafter carries no space current.

During this period discharge device 455 carries no space current because its cathode 458 is maintained positive with respect to ground a sufficient amount that the positive pulses appearing on control electrode 454 by reason of the connections directly with cathode 448 is insufficient to cause the flow of any space current through device 455. Cathode 453 is maintained positive with respect to ground by the voltage division across resistances 461 and 459. Therefore, space current flowing through discharge device 463 maintains anode 467 at a relatively low potential and therefore maintains the middle one of conductors 290 at a relatively low potential. At the same time, since no space current flows through device 462, and of course, no space current through device 455, as just explained, the right hand one of conductors 290 remains at maximum positive potential substantially equal to the potential of source 422.

A succeeding positive going vertical synchronizing pulse on conductors 411 does not alter such condition. It does nothing more than impress a positive pulse on control electrode 452 which, however, is ineffective because anode 450 is maintained at a very low potential, actually lower than that of cathode 448, and the potential of cathode 448 is actually raised somewhat because the positive pulse is transferred through resistance 444 to the control electrode 439 of device 440. In other words, so long as no tone frequency oscillations appear across conductors 299, the right hand one of conductors 290 remains at maximum positive potential and the middle one of conductors 290 remains at a much lower positive potential.

Assume the appearance between conductors 299 of tone frequency oscillation to which the tuned circuit 423, 424 is resonant, such oscillations appearing a short time after the appearance between conductors 411 of a vertical synchronizing pulse. Rectifier 433 develops a potential across resistance 441 in a direction to make control electrode 439 positive with respect to ground. Upon the appearance between conductors 411 of a succeeding vertical synchronizing pulse, control electrode 439, by the combination of rectified oscillations and a positive pulse from resistance 444, reaches a peak voltage of about 26 volts positive, and accordingly cathode 445 also reaches a high positive peak voltage so that control electrode 454 of device 455 becomes sufficiently positive to overcome the bias across cathode resistance 459 and cause device 455 to draw space current. It should be noted that cathode 445, being directly connected with cathode 448, causes it to become positive, but no space current is drawn by device 449 either just before or just after that action because anode 450 is maintained at a very small positive potential by space current flow through device 463 and resistance 451. Immediately upon the flow of space current through device 455, however, current flow through resistance 457 causes reduction in the potential of anode 456 and a corresponding reduction in potential of control electrode 472 of device 463 by reason of connection through coupling condenser 474. In consequence, the flow of space current through device 463 is reduced and the potential of anode 467 increases, causing a simultaneous increase in potential of control electrode 468 of discharge device 462 by reason of coupling condenser 470. This action again is cumulative, finally resulting in the reduction to zero of the flow of space current through device 463 and the increase to the maximum of flow of space current through device 462, whereby the potential of anode 467 increases and the potential of anode 466 decreases. Thereafter, until the disappearance of tone frequency oscillations from conductors 299, the middle one of conductors 290 remains at maximum positive potential and the right hand one of conductors 290 remains at a small positive potential.

The appearance of succeeding positive going vertical synchronizing pulses between conductors 411 does not alter that set of conditions so long as tone frequency oscillations continue on conductors 299 and rectified voltage exists across resistance 441. It should be noted that the flow of space current through device 462 and the corresponding reduction in the potential of anode 466 also reduces the potential of anode 456 after the control electrode 454 was first made sufficiently positive to initiate the flow of space current through device 455. The appearance of succeeding 15 volt positive pulses on control electrode 452 is ineffective to cause device 449 to carry discharge currents because cathode 445 of the device 440 remains at relatively high positive potential because of the continuance of rectified voltage across resistance 441. As soon as tone frequency oscillations disappear from conductors 299, appearance of the next succeeding positive vertical going synchronizing pulse on conductors 411 again causes a reversal of the conditions of the system as first explained. Curves G and H of Figure 16 represents voltage conditions existing respectively at the anodes 450 and 456 of the discharge devices 449 and 455, and of course, also respectively on the middle one and right hand one of the two ungrounded conductors 290. By reference to Figure 13 and the explanation of the operation thereof, it is readily apparent that the voltage conditions of the conductors 290 which exist in response to the presence or absence of tone frequency oscillations on conductors 299 cause horizontal synchronizing pulses in the receiver to be transmitted from conductors 283 of Figure 13 to conductors 285 with or without delay as may be required in the particular system.

With the circuit arrangement illustrated and described in detail, the transmitter of Figure 10, as dictated by the output of frequency divider 289, alternately transmits normal television signals, and signals in which the video signal part is delayed an amount determined by the delay line 355 with respect to the pedestals and synchronizing signals. Any receiver which attempts to pick up the radiated signal thus transmitted and reproduce it can only reproduce a picture which moves rapidly back and forth in the horizontal direction with a resulting blur. One who wishes to receive a correct picture therefore is induced to subscribe to the system in order to receive the key signal as well as the program signal which is radiated, so that a correct picture may be reproduced. A receiver capable of reproducing the picture by synthesis of the program signal and the key signal contains parts which are quite similar to those illustrated for the transmitter.

Figure 15:
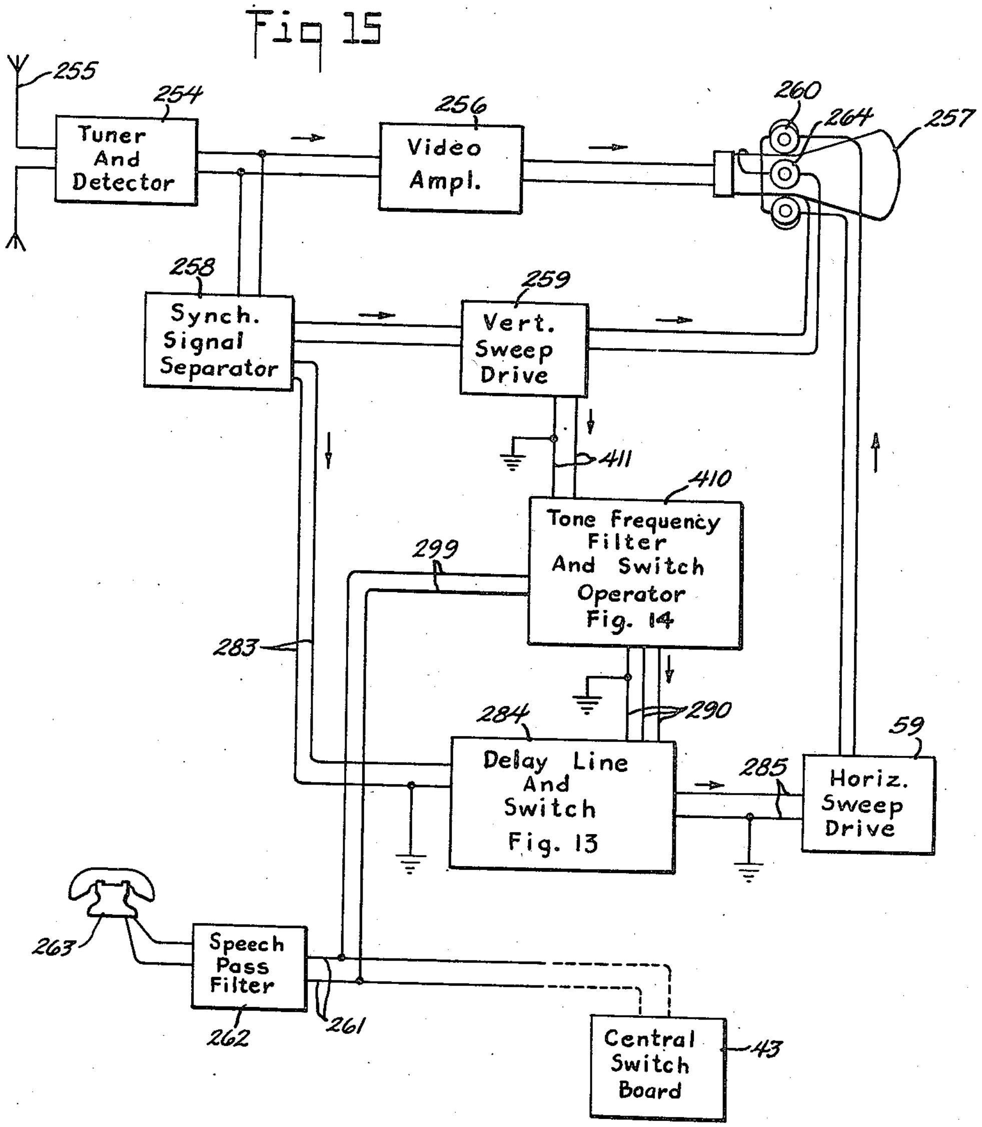
Figure 15 illustrates a detailed circuit arrangement forming a portion of the image receiver of Figure 14.

In Figure 15 a receiver suitable for utilizing such program signal and key signal is illustrated. In this receiver certain of the elements are similar to elements illustrated in Figures 9 and 10 and like reference numerals are applied to them.

In this receiver the wire line conductors 299 leading from the central switchboard 43 are connected with a tone frequency filter and switch operator 410, which is connected through conductors 411 with the vertical sweep drive 259, so that upon the simultaneous occurrence of tone frequency oscillations between conductors 299 and the positive going vertical pulse on conductors 411 from the vertical sweep drive 259, the tone frequency filter and switch operator 410 alters the voltage relation between the two ungrounded conductors 290 connected to it. The conductors 283 leading into the delay line and switch 284, described previously in connection with Figure 10 and in Figure 13, are connected with a synchronizing signal separator 258 so that horizontal synchronizing pulses from the separator 258 are impressed between the two conductors 283. Therefore, upon the output conductors 285 of the delay line and switch 284, there appear horizontal pulses which are either delayed in time or not delayed in accordance with the presence or absence of a tone frequency oscillation on the wire line conductors 299. The horizontal pulses between conductors 285 are impressed on a horizontal sweep drive 59 which is connected to the horizontal sweep coils 260 of the kinescope 257 so that the sweep in the kinescope is delayed or not delayed in proper sequence to reproduce an image which does not move from right to left.

It is readily apparent that the introduction and removal of such delay in the horizontal synchronizing pulses causes proper correction in a receiver arranged as illustrated in Figure 15 for the alteration of the time relation between video signals and synchronizing signals and pedestals, since the parts illustrated as common to the transmitters previously described operate as described.

It has been found that a system of this type in which the time relation between video signals and synchronizing signals is recurrently altered, preferably at more or less random times is not only quite effective in making one who views an uncorrected picture want the key signal, but also that the parts of such system are readily adaptable with little difficulty to present day television receivers.

The present system has one great advantage in that the program signal which is radiated has no characteristic from which the times of alteration of the time relation between video signals and synchronizing signals can be observed. If the times of those time alterations are entirely at random, it is impossible then to produce any correction for the picture unless the tone frequency oscillations are derived from the wire line conductors by one who properly subscribes for them.

While the arrangements disclosed alter the time relation between video signals and timing signals between only two conditions, it is within the scope of this invention to produce such alteration between more than two such conditions by duplication of circuit parts.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A subscription type of television system comprising: a video frequency signal generator; a scanning system for controlling said generator to develop during recurrent trace intervals a video frequency signal representing a scanned subject and including a synchronizing signal generator for developing during interposed intervals a synchronizing signal normally having a fixed time relation with respect to said trace intervals; means for controlling said scanning system to vary the occurrence of said trace intervals relative to said synchronizing signal during spaced time intervals and including a second generator controlled by said scanning system for developing a key signal indicating the times of occurrence of said spaced time intervals; a mixer device coupled to said video frequency signal generator and to said scanning system for producing a television signal which includes in alternation said video frequency signal and said synchronizing signal; means for radiating said television signal to a subscriber receiver; a line circuit coupled to said second generator and extending to said receiver for supplying thereto said key signal; and a picture reconstituting device and an associated scanning system included in said subscriber receiver and responsive conjointly to said television signal and to said key signal for tracing an image of said scanned subject.

2. A subscription type of television system comprising: a video frequency signal generator; a scanning system for controlling said generator to develop during recurrent trace intervals a video frequency signal representing a scanned subject and including a synchronizing signal generator for developing during interposed intervals a synchronizing signal normally having a fixed time relation with respect to said trace intervals; means, controlled by said scanning system, for changing the time relation between said trace intervals and said synchronizing signal during spaced time intervals and including a second generator controlled by said scanning system for developing a key signal indicating the times of occurrence of said spaced time intervals; a mixer device coupled to said video frequency signal generator and to said scanning system for producing a television signal which includes in alternation said video frequency signal and said synchronizing signal; means for radiating a subscriber television signal to said receiver; a line circuit coupled to said second generator and extending to said receiver for supplying thereto said key signal; and a picture reconstituting device and an associated scanning system included in said subscriber receiver and responsive conjointly to said television signal and to said key signal for tracing an image of said scanned subject.

3. A subscription type of television system comprising; a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator controlled by said synchronizing signal generator for developing a key signal; means controlled conjointly by said key signal generator and said synchronizing signal generator for changing the occurrence of said trace intervals relative to said synchronizing signal during spaced time intervals determined by said key signal and individually starting within a retrace interval of said scanning system; a mixer device coupled to said video frequency signal generator and to said scanning system for producing a television signal which includes in alternation said video frequency signal and said synchronizing signal; means for radiating said television signal to said receiver; a line circuit coupled to said key signal generator and extending to said receiver for supplying thereto said key signal; and a picture reconstituting device and an associated scanning system included in said subscriber receiver and responsive conjointly to said television signal and to said key signal for tracing an image of said scanned subject.

4. A subscription type of television system comprising: a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator for developing a key signal; means included in said scanning system and responsive conjointly to said key signal and to said synchronizing signal for introducing a time delay in said scanning system to vary the occurrence of said trace intervals relative to said synchronizing signal during intervals determined by said key signal; a mixer device coupled to said video frequency signal generator and to said scanning system for producing a television signal which includes in alternation said video frequency signal and said synchronizing signal; means for radiating said television signal to said receiver; a line circuit coupled to said key signal generator and extending to said receiver for supplying thereto said key signal; and a picture reconstituting device and an associated scanning system included in said subscriber receiver and responsive conjointly to said television signal and to said key signal for tracing an image of the scanned subject.

5. A subscription type of television system comprising: a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator controlled by said synchronizing signal generator for developing a key signal; a gate circuit disposed between said synchronizing signal generator and said key signal generator for controlling the operation of said key signal generator; means for actuating said gate circuit to impart to said key signal a time characteristic different from said synchronizing signal; means controlled conjointly by said key signal and said synchronizing signal for controlling said scanning system to vary the occurrence of said trace intervals relative to said synchronizing signal during spaced time intervals determined by said key signal; a mixer device coupled to said video frequency signal generator and to said scanning system for producing a television signal which includes in alternation said video frequency signal and said synchronizing signal; means for radiating said television signal to said receiver; a line circuit coupled to said key signal generator and extending to said receiver for supplying thereto said key signal; and an image reconstituting device and associated scanning system included in said subscriber receiver and responsive conjointly to said television signal and to said key signal for tracing an image of the scanned subject.

6. A subscription type of television system comprising: a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator controlled by said synchronizing signal generator for developing a key signal; a delay line; apparatus controlled conjointly by said key signal generator and said synchronizing signal generator for connecting said delay line into the circuit of said scanning system during spaced time intervals determined by said key signal and individually commencing during said retrace intervals to delay the occurrence of said trace intervals relative to said synchronizing signal during said spaced intervals; a mixer device coupled to said video frequency signal generator and to said scanning system for producing a television signal which includes in alternation said video frequency signal and said synchronizing signal; means for radiating said television signal to said receiver; a line circuit coupled to said key signal generator and extending to said receiver for supplying thereto said key signal; and an image reconstituting device and associated scanning system included in said subscriber receiver and responsive conjointly to said television signal and to said key signal for tracing an image of said scanned subject.

7. A subscription type of television transmitter comprising: a video frequency signal generator; a scanning system for controlling said generator to develop during recurrent trace intervals a video frequency signal representing a scanned subject and including a synchronizing signal generator for developing during interposed intervals a synchronizing signal normally having a fixed time relation with respect to said trace intervals; means for controlling said scanning system to vary the occurrence of said trace intervals relative to said synchronizing signal during spaced time intervals including a second generator controlled by said scanning system for developing a key signal indicating the times of occurrence of said spaced time intervals; a mixer device coupled to said video frequency signal generator and to said scanning system for producing a television signal which includes in alternation said video frequency signal and said synchronizing signal; means for radiating said television signal to a point remote from said transmitter; and means, including a line circuit coupled to said second generator for transmitting said key signal to said remote point.

8. A subscription type of television transmitter comprising: a video frequency signal generator; a scanning system for controlling said generator to develop during recurrent trace intervals a video frequency signal representing a scanned subject and including a synchronizing signal generator for developing during interposed intervals a synchronizing signal normally having a fixed time relation with respect to said trace intervals; means, controlled by said scanning system, for changing the time relation between said trace intervals and said synchronizing signal during spaced time intervals and including a second generator controlled by said scanning system for developing a key signal indicating the times of occurrence of said spaced time intervals; a mixer device, coupled to said video frequency signal generator and to said scanning system, for producing a television signal which includes in alternation said video frequency signal and said synchronizing signal; means for radiating said television signal to a point remote from said transmitter; and means including a line circuit coupled to said second generator for transmitting said key signal to said remote point.

9. A subscription type of television transmitter comprising: a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator controlled by said synchronizing signal generator for developing a key signal; means controlled conjointly by said key signal generator and said synchronizing signal generator for changing the occurrence of said trace intervals relative to said synchronizing signal during spaced time intervals determined by said key signal individually starting within said retrace intervals; a mixer device coupled to said video frequency signal generator and to said scanning system for producing a television signal which includes in alternation said video frequency signal and said synchronizing signal; means for radiating said television signal to a point remote from said transmitter; and means including a line circuit coupled to said key signal generator for transmitting said key signal to said remote point.

10. A subscription type of television transmitter comprising: a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator for developing a key signal; means coupled to said scanning system and responsive conjointly to said key signal and to said synchronizing signal for introducing a time delay in said scanning system to vary the occurrence of said trace intervals relative to said synchronizing signal during intervals determined by said key signal; a mixer device coupled to said video frequency signal generator and to said scanning system for producing a television signal which includes in alternation said video frequency signal and said synchronizing signal; means for radiating said television signal to a point remote from said transmitter; and means including a line circuit coupled to said key signal generator for transmitting said key signal to said remote point.

11. A subscription type of television transmitter comprising: a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator controlled by said synchronizing signal generator for developing a key signal; a gate circuit disposed between said synchronizing signal generator and said key signal generator for controlling the operation of said key signal generator; means for actuating said gate circuit for random periods of time to impart a random time characteristic to said key signal; means controlled conjointly by said key signal generator and said synchronizing signal generator for controlling said scanning system to vary the occurrence of said trace intervals relative to said synchronizing signal during spaced time intervals determined by said key signal; a mixer device coupled to said video frequency signal generator and to said scanning system for producing a television signal which includes in alternation said video frequency signal and said synchronizing signal; means for radiating said television signal to a point remote from said transmitter; and means including a line circuit coupled to said key signal generator for transmitting said key signal to said remote point.

12. A subscription type of television transmitter comprising: a video frequency signal generator; a scanning system for controlling said generator to develop during recurrent trace intervals a video frequency signal representing a scanned subject and including a synchronizing signal generator for developing during interposed retrace intervals a synchronizing signal normally having a fixed time relation with respect to said trace intervals; a key signal generator controlled by said synchronizing signal generator for developing a key signal; a delay line; apparatus, controlled conjointly by said key signal generator and said synchronizing signal generator, for connecting said delay line into the circuit of said scanning system during spaced time intervals to delay the occurrence of said trace intervals relative to said synchronizing signal during said spaced intervals, a mixer device coupled to said video frequency signal generator and to said scanning system for producing a television signal which includes in alternation said video frequency signal and said synchronizing signal: means for radiating said television signal to a point remote from said transmitter; and means including a line circuit coupled to said key signal generator for transmitting said key signal to said remote point.

13. A subscription type of television receiver for conjointly utilizing a television signal received over one channel and a key signal received over another channel, said television signal including video frequency signals and interposed synchronizing signals having a time relation with respect to one another that is altered during spaced time intervals, and said key signal indicating the times of such alterations; said receiver including: an image reproducing unit and an associated scanning unit; means for supplying said television signal to said reproducing unit and its scanning unit; apparatus coupled to at least one of said units and responsive to an applied signal to shift from one operating condition to another operating condition for effectively producing a compensating alteration in the time relation between said video frequency signals and said synchronizing signals of said received television signal; and means responsive to said key signal for supplying an actuating signal to said apparatus so that said compensating alteration occurs in synchronism with the alteration of said received television signal, thereby causing said reproducing unit to trace an image represented by said television signal.

14. A subscription type of television receiver for conjointly utilizing a television signal received over one channel and a key signal received over another channel, said television signal including video frequency signals and an interposed synchronizing signal having a time relation with respect to one another that is altered during spaced time intervals, and said key signal indicating the times of such alterations; said receiver including: an image reproducing device and an associated scanning system; means for supplying said television signal to said reproducing device and its scanning system; apparatus coupled to said scanning system and responsive to an applied signal to shift from one operating condition to another operating condition for effectively producing a compensating alteration in the time relation between said video frequency signals and said synchronizing signal; and means responsive conjointly to said synchronizing signal and to said key signal for supplying an actuating signal to said apparatus so that said compensating alterations of said received television signal, thereby causing said reproducing device to trace an image represented by said television signal.

15. A subscription type of television receiver for conjointly utilizing a television signal received over one channel and a key signal received over another channel, said television signal including video frequency signals and an interposed synchronizing signal having a time relation with respect to one another that is altered during spaced time intervals, and said key signal indicating the times of such alterations; said receiver including: an image reproducing device and an associated scanning system; means for supplying said television signal to said reproducing device and its scanning system; delay apparatus coupled to said scanning system and responsive conjointly to said key signal and to said synchronizing signal to shift from one operating condition to another operating condition for effectively producing a compensating alteration in the time relation between said video frequency signals and said synchronizing signal during said spaced time intervals, thereby causing said reproducing device to trace an image represented by said television signal.

16. A subscription type of television receiver for conjointly utilizing a television signal received over one channel and a key signal received over another channel, said television signal including video frequency signals and an interposed synchronizing signal having a time relation with respect to one another that is altered during spaced time intervals, and said key signal indicating the times of such alteration; said receiver including: an image reproducing device and an associated scanning system; means for supplying said television signal to said reproducing device and its scanning system; apparatus coupled to said scanning system and responsive to an applied signal to shift from one operating condition to another operating condition for effectively producing a compensating alteration in the time relation between said video frequency signals and said synchronizing signal; means responsive to said synchronizing signal for supplying an actuating signal to said apparatus; a gate circuit coupled to said last named means for causing said actuating signal to be applied to said apparatus only when said gate circuit is open; and means for impressing said key signal on said gate circuit to open said gate circuit during said spaced time intervals; whereby said reproducing device traces an image represented by said video frequency signals.

17. A subscription type of television receiver for conjointly utilizing a television signal received over one channel and a key signal received over another channel, said television signal including video frequency signals and an interposed synchronizing signal having a time relation with respect to one another that is altered during spaced time intervals, and said key signal indicating the times of such alterations; said receiver including: an image reproducing device and an associated scanning system; means for supplying said television signal to said reproducing device and its scanning system; a delay line for producing a compensating alteration in the time relation between said video frequency signals and said synchronizing signal when switched into the circuit of said scanning system; and apparatus responsive conjointly to said synchronizing signal and to said key signal for switching said delay line into the circuit of said scanning system during said spaced time intervals, thereby causing said reproducing device to trace the image represented by said video frequency signals.

18. A decoder for a subscription type television receiver utilizing a coded television signal received over a first channel and a key signal received over a second channel, said television signal including video frequency signals and interposed synchronizing signals having a time relation with respect to one another that is altered during spaced time intervals, and said key signal having portions indicating the times of such alterations, said decoder comprising: time-delay apparatus actuable between two operating conditions for effectively producing a compensating alteration in the time relation between said video frequency signals and said synchronizing signals; a control network coupled to said apparatus and responsive to the coincident application of said synchronizing and key signals for developing a control potential to actuate said apparatus from one of said operating conditions to the other; a first input circuit for supplying said key signal to said network; and a second input circuit for supplying said synchronizing signals to said network, whereby coincidence of said synchronizing signals and said portions of said key signal causes said network to actuate said apparatus during said spaced time intervals.

19. A decoder for a subscription type television receiver utilizing a coded television signal received over a first channel and a key signal received over a second channel, said television signal including video frequency signals and interposed synchronizing signals and having a characteristic that is altered during spaced time intervals, and said key signal having portions indicating the times of such alteration, said decoder comprising: apparatus actuable between two operating conditions for effectively producing a compensating alteration in said characteristic of said television signal; a control network coupled to said apparatus and responsive to the coincident application of said synchronizing and key signals for developing a control potential to actuate said apparatus from one of said operation conditions to the other; a first input circuit for supplying said key signal to said network; and a second input circuit for supplying said synchronizing signals to said network, whereby coincidence of said synchronizing signals and said portions of said key signal causes said network to actuate said apparatus during said spaced time intervals.

20. A decoder for a subscription type television receiver utilizing a coded television signal received over a first channel and a key signal received over a second channel, said television signal including video frequency signals and interposed synchronizing pulses having a time relation with respect to one another that is altered during spaced intervals, and said key signal being characterized by signal bursts indicating the times of such alteration, said decoder comprising: time-delay apparatus actuable between two operating conditions in one of which a time delay is introduced for effectively producing a compensating alteration in the time relation between said video frequency signals and said synchronizing pulses; a control network coupled to said apparatus and responsive to the coincident application of said synchronizing and key signals for developing a control potential to actuate said apparatus from one of said operating conditions to the other; a first input circuit for supplying said key-signal bursts to said network; and a second input circuit for supplying said synchronizing pulses to said network to cause said network to actuate said apparatus during coincidence of said key-signal bursts and said synchronizing pulses.

21. A decoder for a subscription type television receiver utilizing a coded television signal received over a first channel and a key signal received over a second channel, said television signal including video frequency signals and interposed synchronizing pulses and having a characteristic that is altered during spaced intervals, and said key signal having bursts of energy indicating the times of such alteration, said decoder comprising: apparatus actuable between two operating conditions for effectively producing a compensating alteration in said characteristic of said television signal; a control network, coupled to said apparatus, responsive to the coincident application of said synchronizing and key signals for developing a control potential to actuate said apparatus from one of said operating conditions to the other and responsive in the presence of only one of said pair of signals to return said apparatus to said one operating condition; a first input circuit for supplying said key-signal to said network; and a second input circuit for supplying said synchronizing pulses to said network to cause said network to actuate said apparatus between said operating conditions in accordance with the time relation of said bursts of said key signal and said synchronizing pulses.

22. A decoder for a subscription type television receiver utilizing a coded television signal received over a first channel and a key signal received over a second channel, said television signal including video frequency signals and interposed synchronizing pulses and having a characteristic that is altered during spaced intervals, and said key signal having bursts of energy indicating the times of such alteration, said decoder comprising: apparatus actuable between two operating conditions for effectively producing a compensating alteration in said characteristic of said television signal; a trigger circuit including a pair of alternately conductive electron-discharge devices; means responsive to the coincident application of said key-signal bursts and said synchronizing pulses for triggering said devices in one sense; means responsive to the application of said synchronizing pulses alone and insensitive in the presence of said key-signal bursts for triggering said devices in an opposite sense; and a control circuit extending from said devices to said apparatus for supplying an actuating signal thereto having amplitude variations determined by the triggering of said devices from said one to said opposite sense.

23. A decoder for a subscription type television receiver utilizing a coded television signal received over a first channel and a key signal received over a second channel, said television signal including video frequency signals and interposed synchronizing pulses and having a characteristic that is altered during spaced intervals, and said key signal having bursts of energy indicating the times of such alteration, said decoder comprising: apparatus actuable between two operating conditions for effectively producing a compensating alteration in said characteristic of said television signal; a trigger circuit including a pair of alternately conductive electron-discharge devices; means having a preselected operating threshold and responsive to the coincident application of said synchronizing pulses and said bursts of key signal having an amplitude exceeding said threshold for triggering said devices in one sense; means responsive to the application of said synchronizing pulses alone and insensitive in the presence of said key signal bursts having an amplitude exceeding said threshold for triggering said devices in an opposite sense; and a control circuit extending from said devices to said apparatus for supplying an actuating signal thereto having amplitude variations determined by the triggering of said devices from said one to said opposite sense.

ERWIN M. ROSCHKE.

REFERENCES CITED

The following references are of record in the file of this patent:

UNITED STATES PATENTS

| Number | Name | Date |
|---|---|---|
| 1,657,366 | Belin | Jan. 24, 1928 |
| 1,688,451 | Demarest | Oct. 23, 1928 |
| 1,688,452 | Demarest | Oct. 23, 1928 |
| 1,688,453 | Demarest | Oct. 23, 1928 |
| 1,706,378 | Clement | Mar. 19, 1929 |
| 1,811,102 | Adams | June 23, 1931 |
| 1,932,253 | Ives | Oct. 24, 1933 |
| 2,251,525 | Rosenthal | Aug. 5, 1941 |
| 2,401,405 | Bedford | June 4, 1946 |
| 2,402,058 | Loughren | June 11, 1946 |
| 2,402,067 | Mathes | June 11, 1946 |
| 2,403,059 | Dillenback | July 2, 1946 |
| 2,405,252 | Goldsmith | Aug. 6, 1946 |
| 2,406,811 | Deloraine | Sept. 3, 1946 |
| 2,414,101 | Hogan | Jan. 14, 1947 |
| 2,417,847 | Thompson | Mar. 25, 1947 |
| 2,419,568 | Labin | Apr. 29, 1947 |
| 2,429,787 | Young | Oct. 28, 1947 |
| 2,472,774 | Mayle | June 7, 1949 |

FOREIGN PATENTS

| Number | Country | Date |
|---|---|---|
| 377,175 | Great Britain | July 19, 1932 |
| 386,649 | Great Britain | Jan. 26, 1933 |